US010298825B2

(12) United States Patent
Wexler et al.

(10) Patent No.: US 10,298,825 B2
(45) Date of Patent: May 21, 2019

(54) SYSTEMS AND METHODS FOR REMEMBERING HELD ITEMS AND FINDING LOST ITEMS USING WEARABLE CAMERA SYSTEMS

(71) Applicant: OrCam Technologies, Ltd., Jerusalem (IL)

(72) Inventors: Yonaton Wexler, Jerusalem (IL); Amnon Shashua, Mevaseret Zion (IL)

(73) Assignee: OrCam Technologies Ltd., Jerusalem (IL)

(*) Notice: Subject to any disclaimer, the term of this patent is extended or adjusted under 35 U.S.C. 154(b) by 538 days.

(21) Appl. No.: 14/807,373

(22) Filed: Jul. 23, 2015

(65) Prior Publication Data
US 2016/0028917 A1 Jan. 28, 2016

Related U.S. Application Data

(60) Provisional application No. 62/027,936, filed on Jul. 23, 2014, provisional application No. 62/027,957, filed on Jul. 23, 2014.

(51) Int. Cl.
H04N 1/21 (2006.01)
G01S 3/786 (2006.01)
(Continued)

(52) U.S. Cl.
CPC ......... H04N 5/2259 (2013.01); G01S 3/7864 (2013.01); G02B 27/0093 (2013.01);
(Continued)

(58) Field of Classification Search
CPC .......... G01S 3/7864; G02B 2027/0138; G02B 2027/014; G02B 2027/0178; G02B 2027/0187; G02B 27/0093; G02B 27/017; G06F 17/30277; G06F 1/163; G06F 1/1686; G06F 1/18; G06F 1/188; G06F 2203/011; G06F 3/005; G06F 3/011
(Continued)

(56) References Cited

U.S. PATENT DOCUMENTS

2008/0243614 A1* 10/2008 Tu .......................... G06Q 30/02
705/14.66
2014/0180757 A1* 6/2014 Argue ................ G06Q 30/0201
705/7.29
(Continued)

Primary Examiner — William C Vaughn, Jr.
Assistant Examiner — Naod W Belai
(74) Attorney, Agent, or Firm — Finnegan, Henderson, Farabow, Garrett & Dunner, LLP

(57) ABSTRACT

Apparatuses and methods are provided for storing information related to objects associated with a hand of a user via a wearable camera system. In one implementation, a wearable apparatus for storing the information is provided comprising a wearable image sensor configured to capture a plurality of images from the environment of the user, and at least one processing device programmed to process the images. The processing device may detect the hand of the user, and an object associated with the user's hand. The processing device may proceed to store information related to the object. Consistent with disclosed embodiments, the stored information may be used for various purposes, such as warning the user of dangers, catering advertising to the user, and helping the user find objects when they are lost.

24 Claims, 20 Drawing Sheets

(51) Int. Cl.
| | |
|---|---|
| H04N 5/232 | (2006.01) |
| H04N 5/225 | (2006.01) |
| G06F 1/18 | (2006.01) |
| G06F 16/532 | (2019.01) |
| G02B 27/00 | (2006.01) |
| G02B 27/01 | (2006.01) |
| G06F 3/01 | (2006.01) |
| G06Q 30/02 | (2012.01) |
| H04N 7/18 | (2006.01) |
| G06F 1/16 | (2006.01) |
| G06F 3/00 | (2006.01) |
| G06F 3/038 | (2013.01) |
| H04N 5/235 | (2006.01) |
| G06K 9/00 | (2006.01) |
| G06T 7/20 | (2017.01) |
| H04N 5/44 | (2011.01) |
| G06K 9/62 | (2006.01) |
| G06F 3/03 | (2006.01) |
| G06T 7/00 | (2017.01) |
| G06T 7/73 | (2017.01) |

(52) U.S. Cl.
CPC .......... *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 16/532* (2019.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(58) Field of Classification Search
USPC .......................................................... 348/169
See application file for complete search history.

(56) References Cited

U.S. PATENT DOCUMENTS

2014/0362223 A1* 12/2014 LaCroix ................. H04N 7/183
  348/150
2015/0248772 A1*  9/2015 Gove ..................... H04N 5/247
  348/158

* cited by examiner

SYSTEMS AND METHODS FOR REMEMBERING HELD ITEMS AND FINDING LOST ITEMS USING WEARABLE CAMERA SYSTEMS

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

BACKGROUND

I. Technical Field

This disclosure generally relates to devices and methods for capturing and processing images from an environment of a user. More particularly, this disclosure relates to devices and methods for deriving and storing information relating to objects held by a user in image data captured by a wearable camera system, and accessing such information to find lost objects.

II. Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide apparatuses and methods for storing information related to objects previously held by a user, and for using that information to find lost objects using information provided by a wearable camera system.

In accordance with a disclosed embodiment, a wearable apparatus for storing information related to objects associated with a hand of a user is provided. The apparatus may comprise a wearable image sensor configured to capture a plurality of images from an environment of a user, and at least one processing device. The processor device may be programmed to process the plurality of images to detect the hand of the user in at least one of the plurality of images. Further, the processor device may be programmed to process the at least one image to detect an object that is associated with the hand of the user. Also, the processor device may be programmed to store information related to the object.

In accordance with another disclosed embodiment, a wearable apparatus for determining a last known location of an object is provided. The apparatus may comprise a wearable image sensor configured to capture a plurality of images from an environment of a user, and at least one processing device. The processor device may be programmed to process the plurality of images to detect an image showing an object of interest. Also, the processor device may be programmed to identify a location associated with the detected image and produce location information related to the location. The processor device may further be programmed to store, in a memory, the location information with information associated with the object of interest.

In accordance with yet another disclosed embodiment, a method for storing information related to objects associated with a hand of a user of a wearable device is provided. The method includes processing a plurality of images captured by a wearable image sensor included in the wearable device to detect the hand of the user in at least one of the plurality of images. The method further includes processing the at least one of the plurality of images to detect an object associated with the hand of the user. Also, the method includes storing information related to the object.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1A:
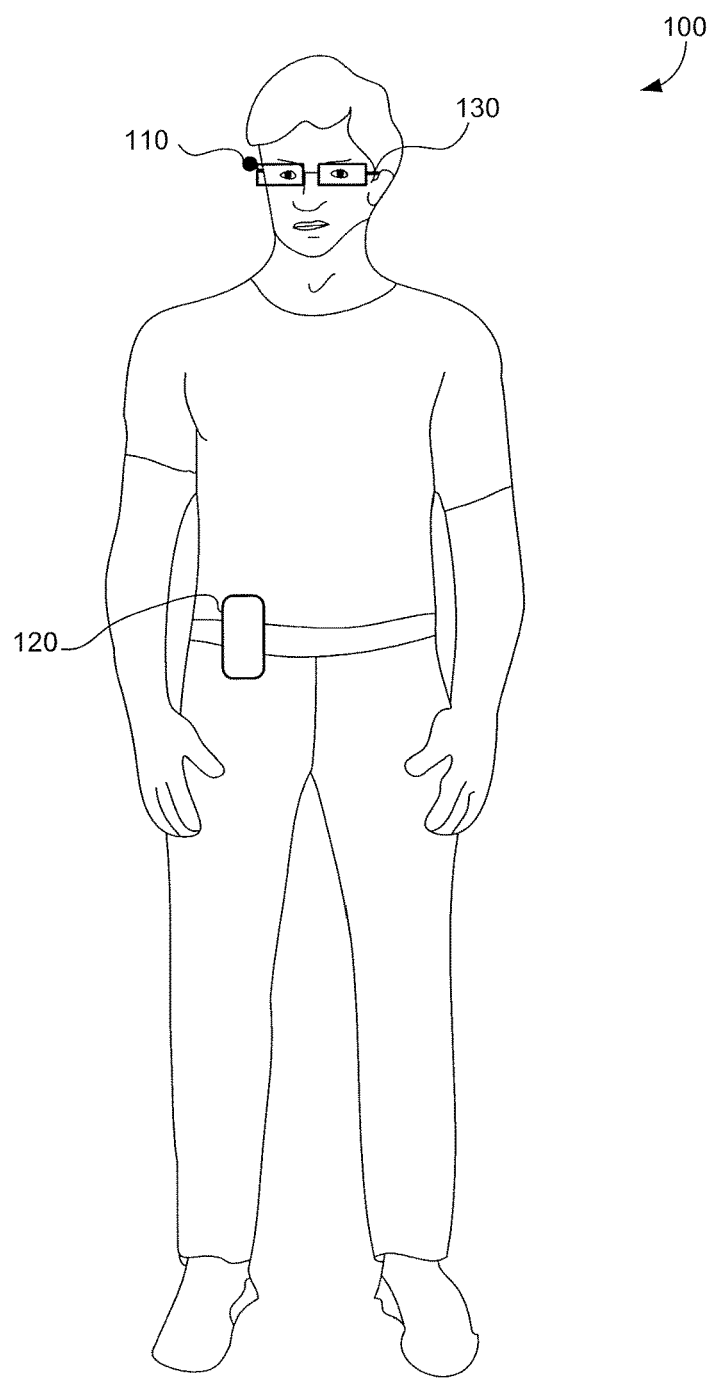
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
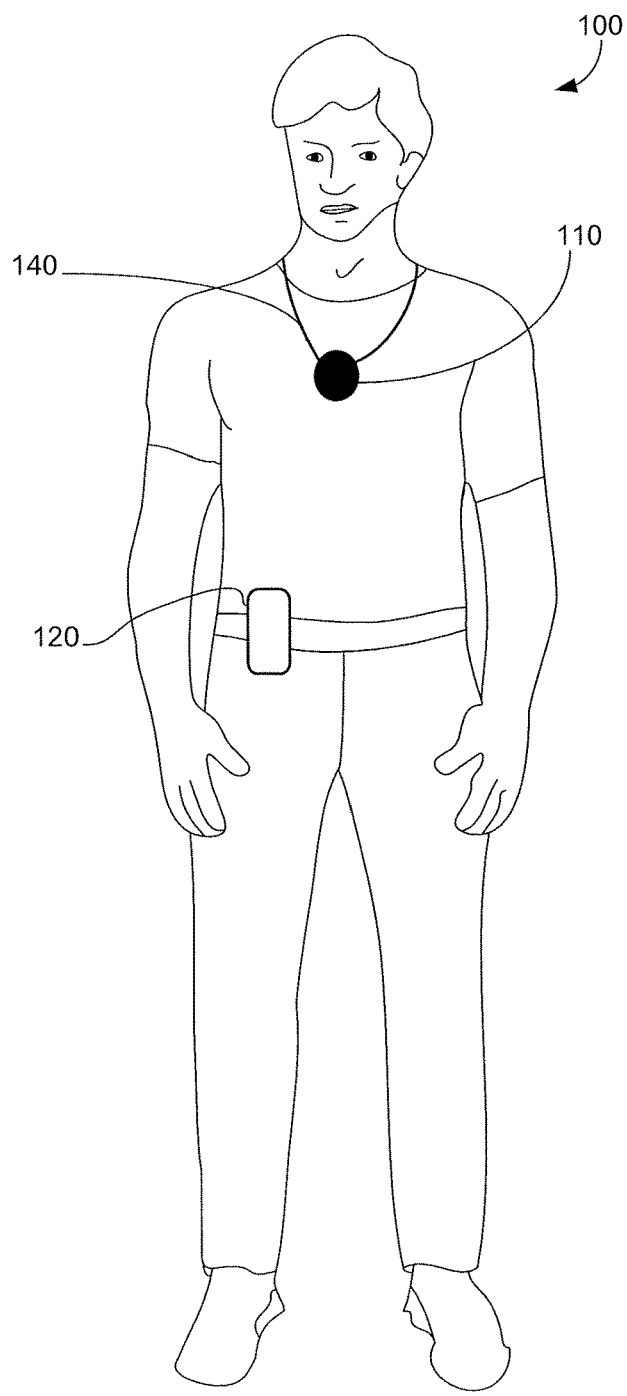
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
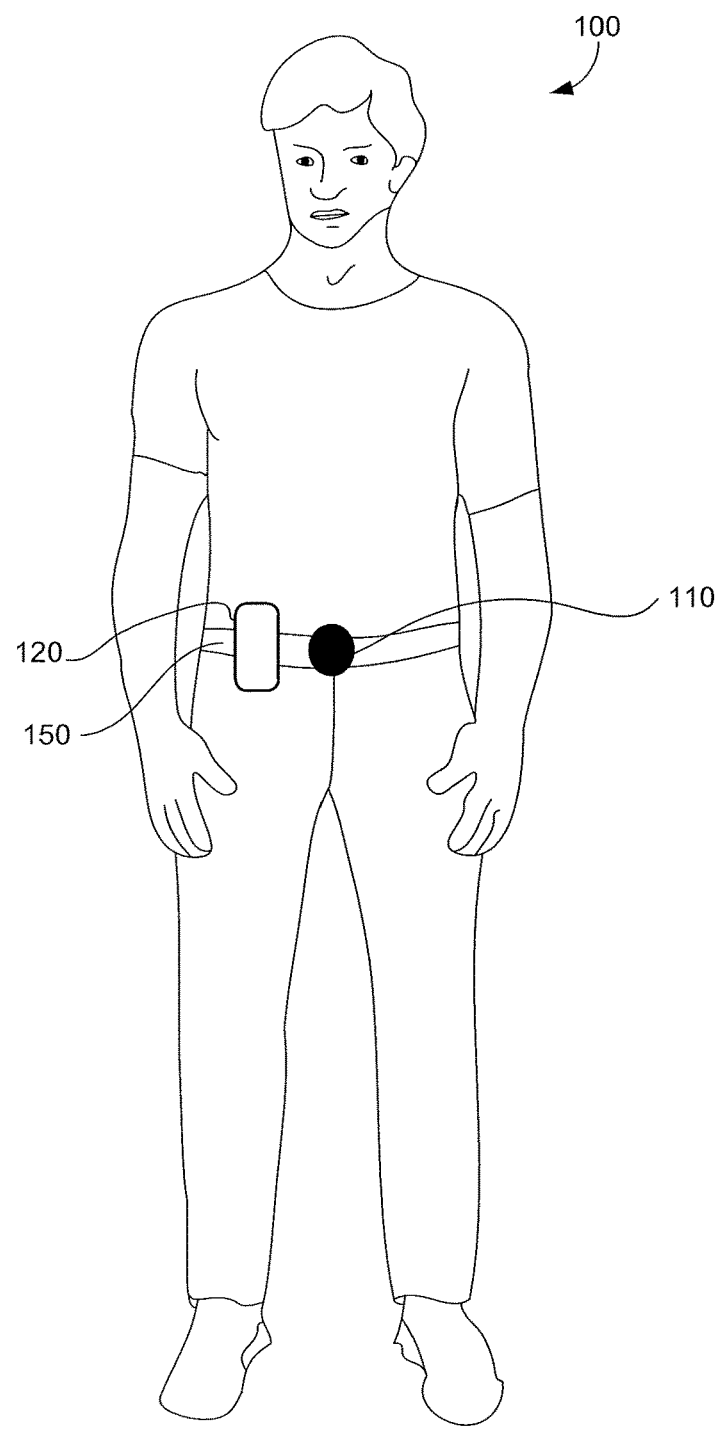
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
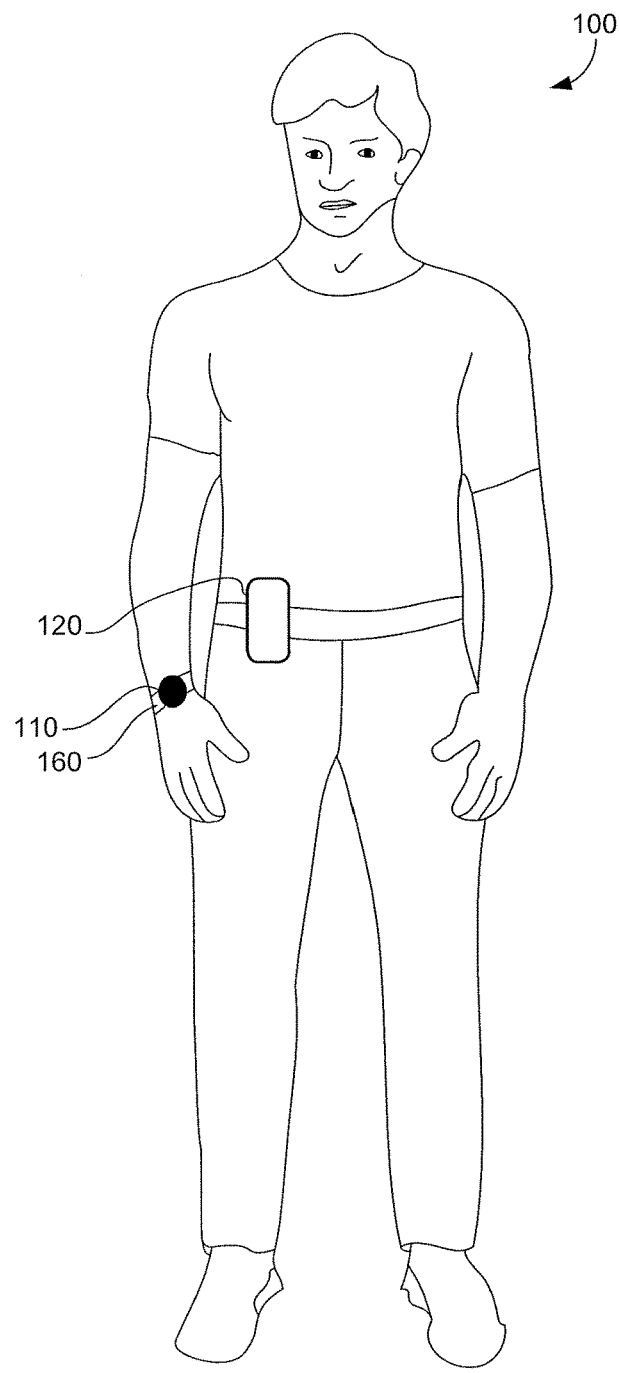
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
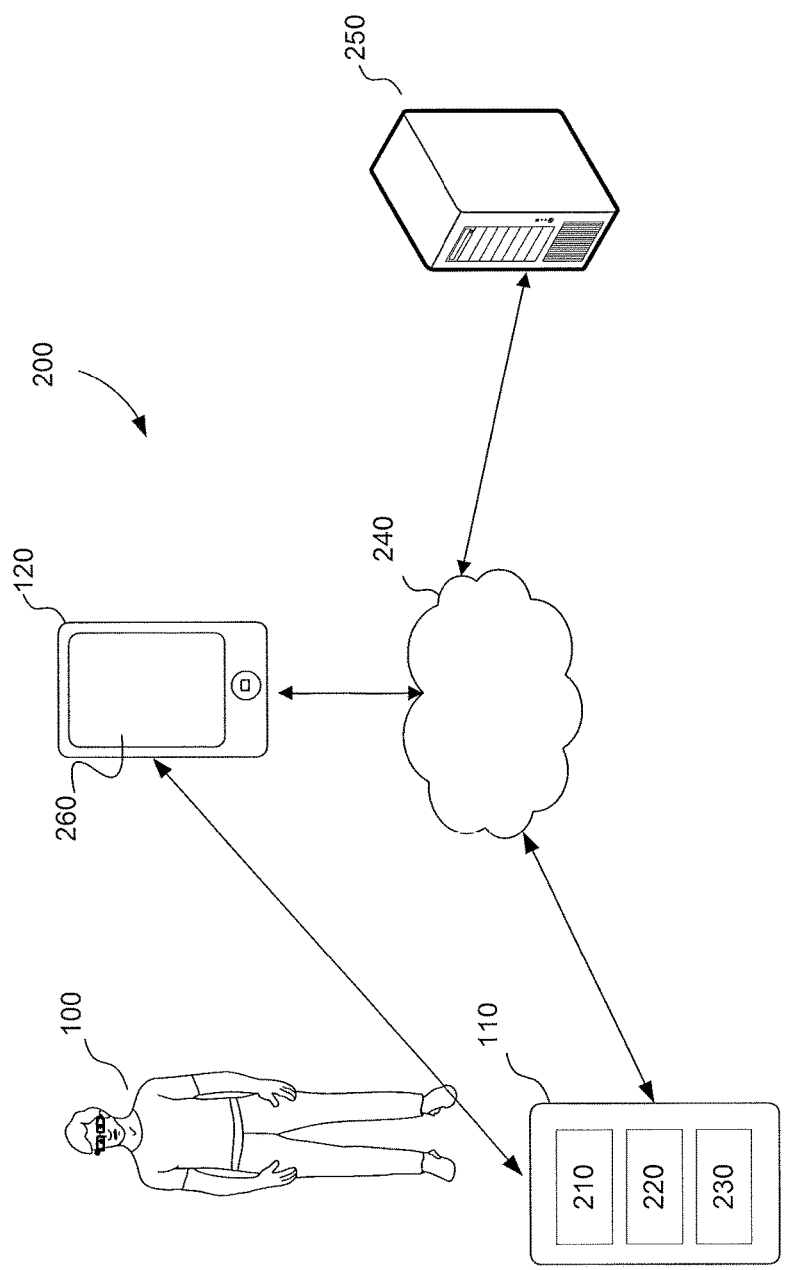
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
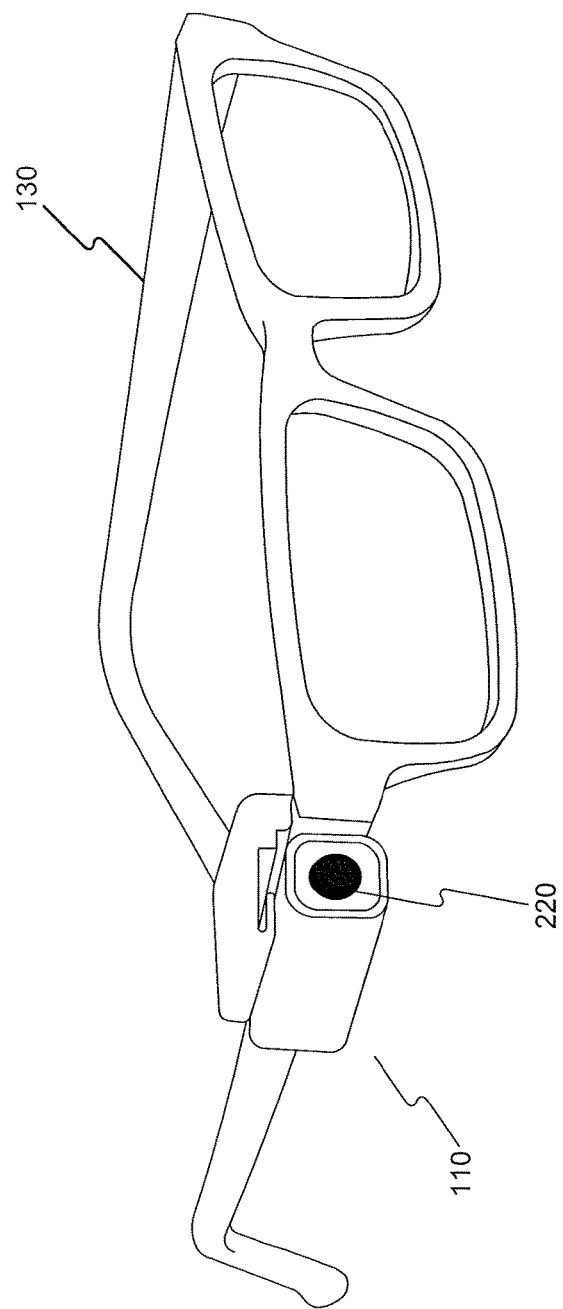
FIG. 3A is a schematic illustration of an example of the wearable apparatus shown in FIG. 1A.

An example wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
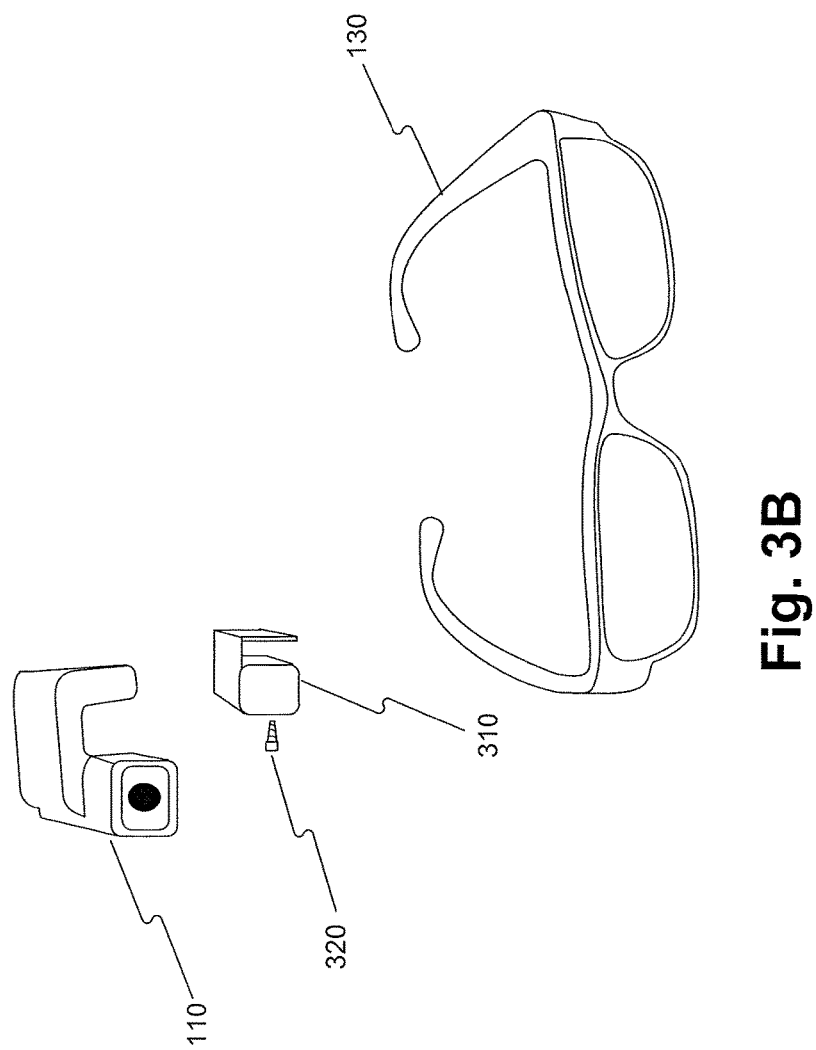
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
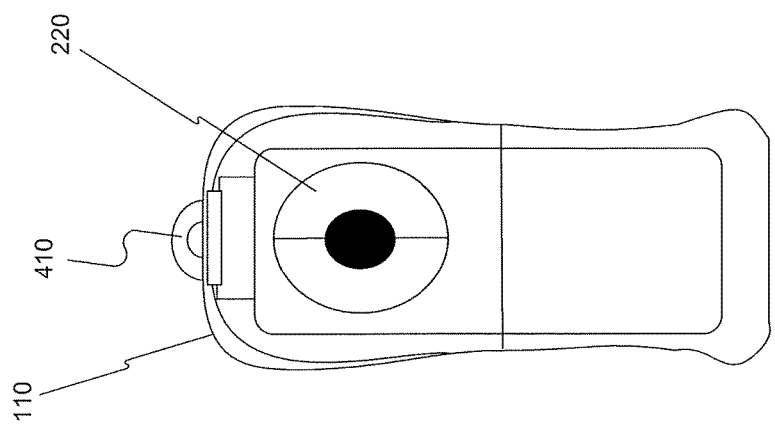
FIG. 4A is a schematic illustration of an example of the wearable apparatus shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
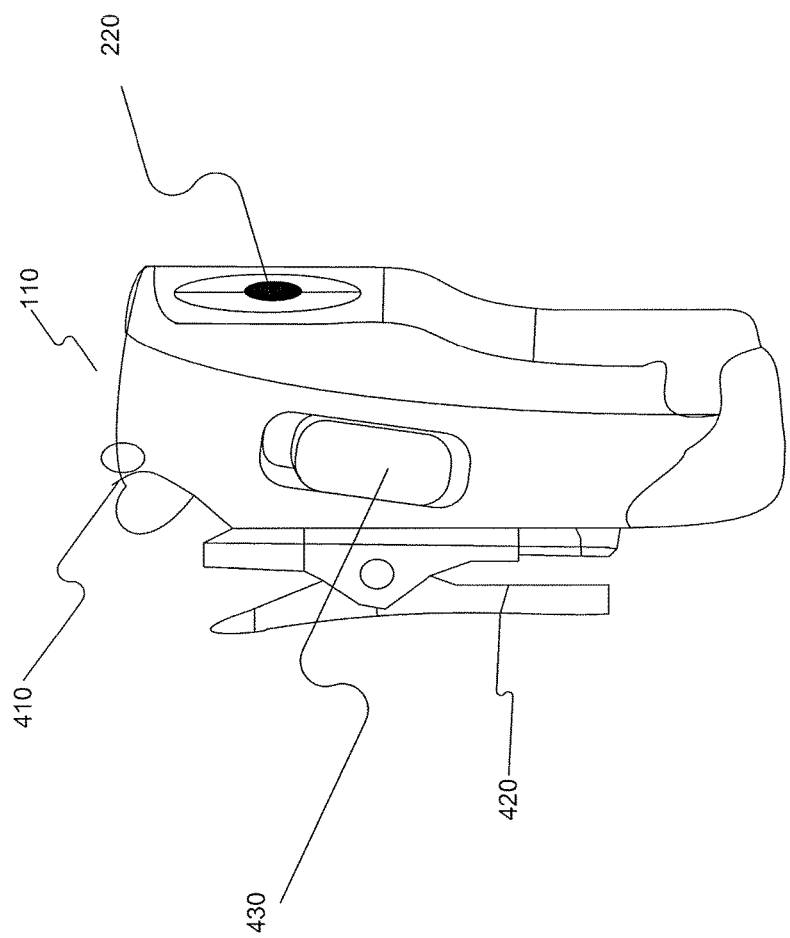
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
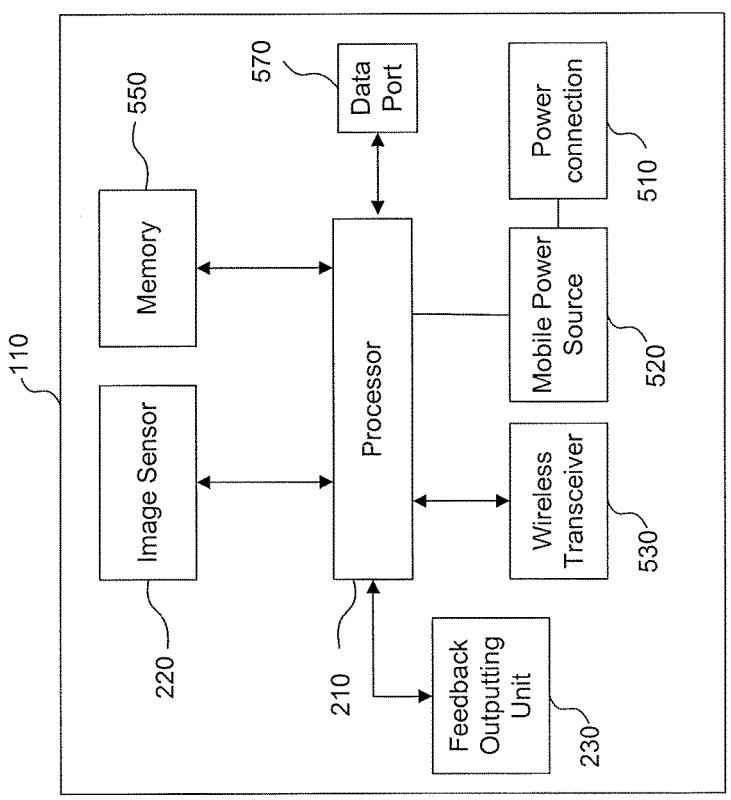
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc.

Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
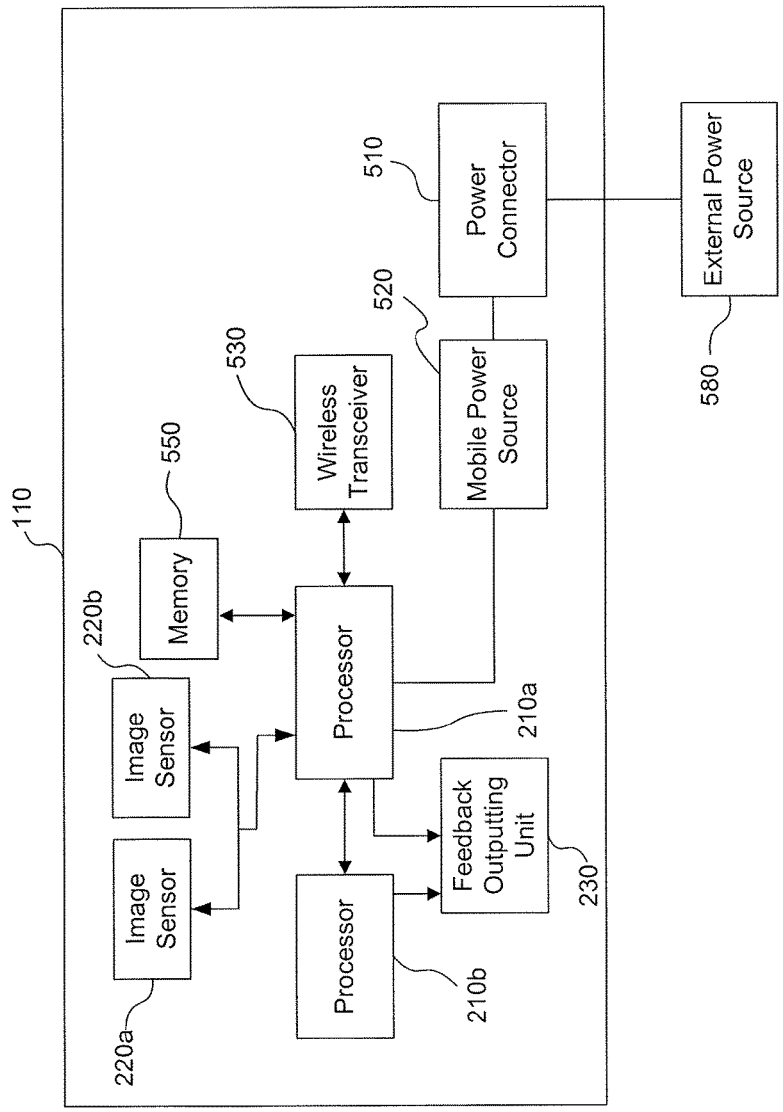
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback-outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
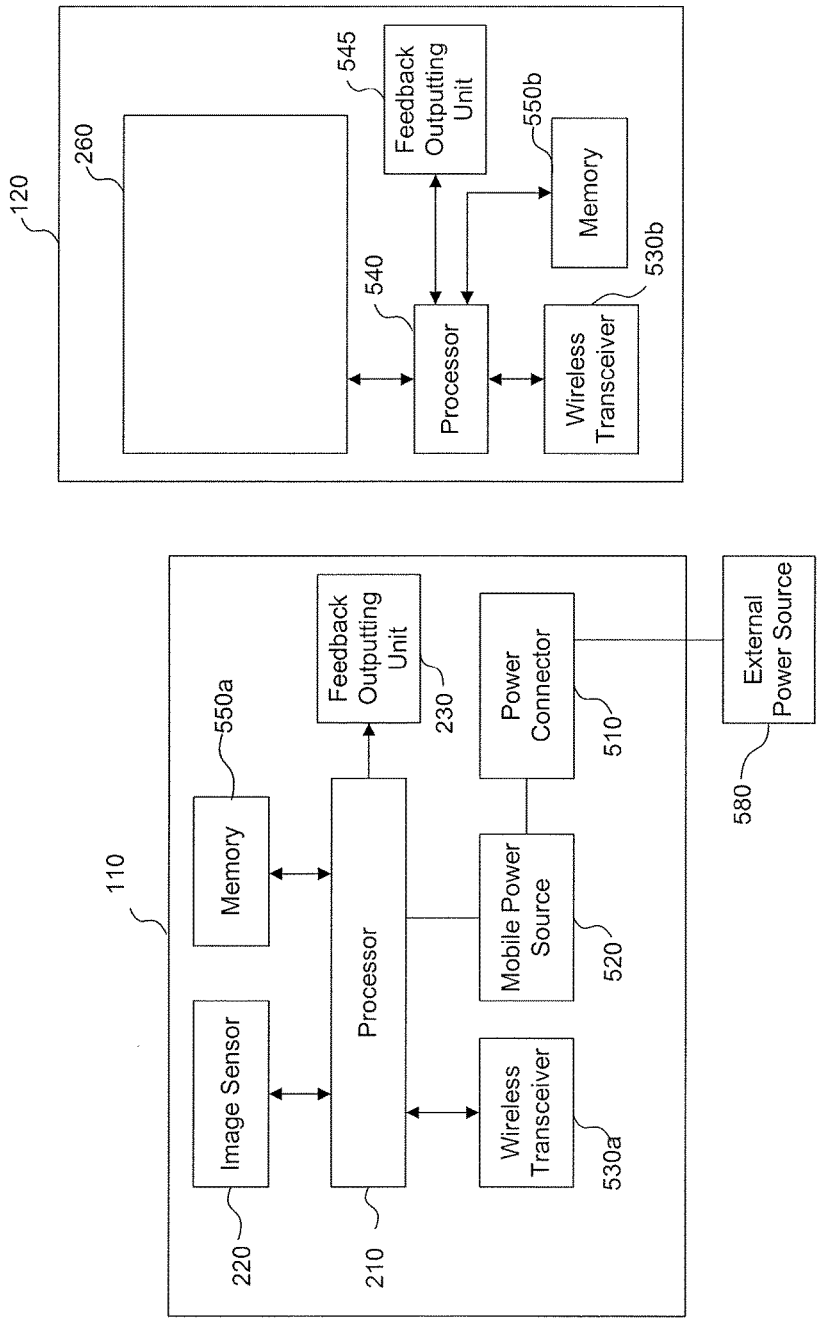
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

One application of wearable technology and "life logging" is the ability to derive and store information related to objects that the user encounters for later use. As one example, an individual user 100 may use a wearable camera system to life log, and the camera system may detect that the user is holding an object. Apparatus 110 may execute software instructions to create an entry within a database for the object, thus reflecting a "catalog" of objects that the user encountered in his or her environment. This catalog can be deployed for situations beneficial to the user. For example, objects known to be harmful to the user, such as food that is an allergen or drugs that cause interactions or side effects, can be detected and information stored for those objects can be retrieved from the database. The user can then be quickly warned of the danger in an efficient manner.

Figure 6:
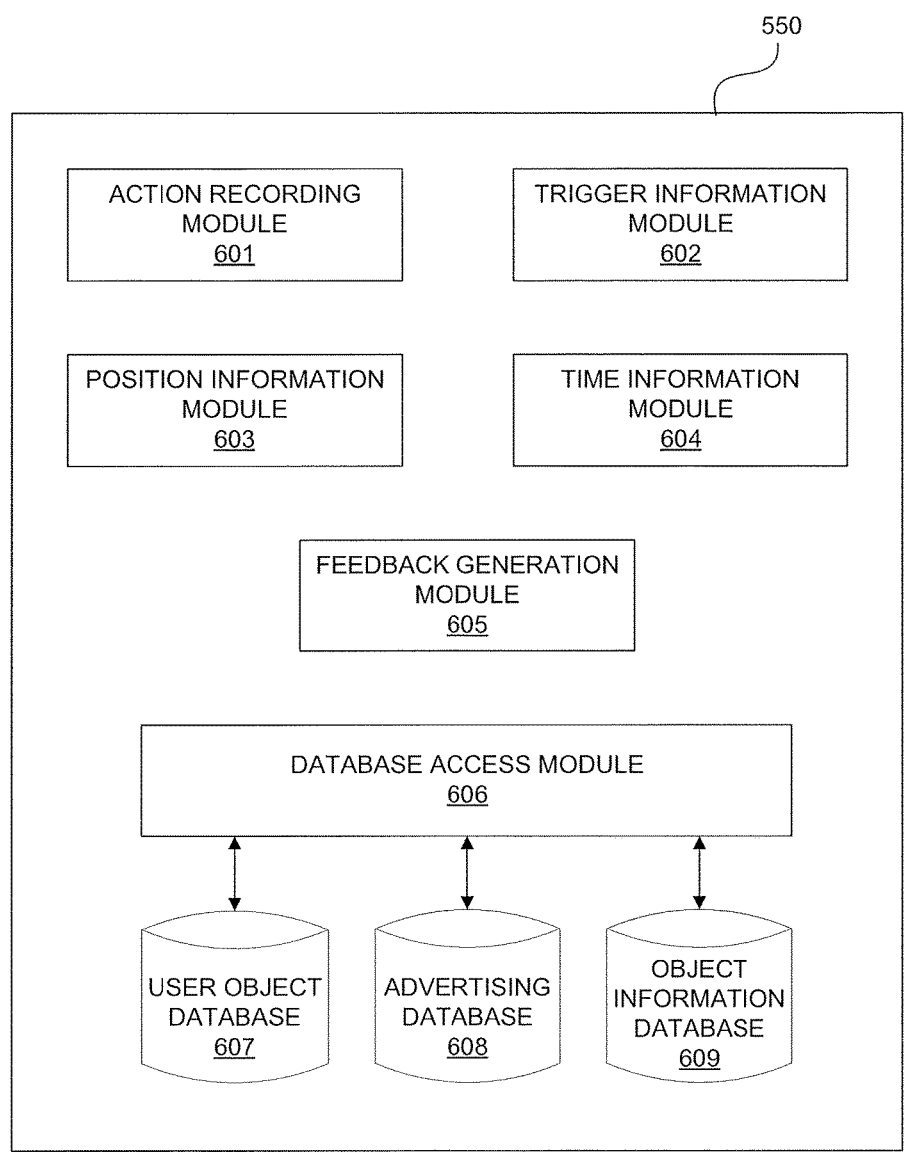
FIG. 6 is a block diagram illustrating an example of a memory contained within an apparatus for deriving and storing information relating to objects held by a user in image data from a wearable camera system, consistent with disclosed embodiments.

FIG. 6 is a block diagram illustrating memory 550 associated with apparatus 110 according to one embodiment. The memory may include one or more modules or sets of instructions, which when executed by at least one processing device, carry out methods consistent with the disclosed embodiments. For example, the memory may include instructions executable by the at least one processing device to process or analyze images captured by the image sensors. In some embodiments, the processing device may be included in wearable apparatus 110. For example, the processing device may include processor 210, 210a, and/or 210b shown in FIGS. 5A and 5B. The processing device may process the image data captured by the image sensors in near real time, as the image data are being captured by the image sensors. In some embodiments, the processing device may include a processor that is separately located from wearable apparatus 110. The processing device may include a processor that is remotely connected with wearable apparatus 110 through network 240, which may be a wired or wireless network, or through any other connectivity means, such as Bluetooth, near field communication (NFC), etc. For example, the processing device may include processor 210 included in computing device 120, which may be connected with wearable apparatus 110 through a wired or wireless connection, such as through a cable, Bluetooth, WiFi, infrared, or near field communication (NFC). In some embodiments, the processing device may include a processor included in server 250, which may be wirelessly connected with wearable apparatus 110 through network 240. In some embodiments, the processing device may include a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time. Further, in some embodiments, one or more database and one more modules may be located in remotely from wearable apparatus 110 (e.g., included in computing device 120 and/or server 250).

In the example shown in FIG. 6, memory 550 comprises an action recording module 601, a trigger information module 602, a position information module 603, a time information module 604, a feedback generation module 605, a database access module 606, a user object database 607, an advertising database 608, and an object information database 609. Additional or fewer databases and/or modules may be included in memory 550. The modules and databases shown in FIG. 6 are examples, and a processor in the disclosed embodiments may operate according to any suitable process.

Action recording module 601 may provide functionality for apparatus 110 to capture and/or store image data. In some embodiments, this image data may include or depict actions performed by user 100 via image sensor 220. For example, as part of "life logging," image sensor 220 may capture anything that appears in the field of view of user 100. Processor 210 may execute action recording module 601 to cause image sensor 220 to acquire the images, and may additionally use action recording module 601 to adjust one or more parameters associated with image sensor 220. In some embodiments, user 100 may be able to start and stop the collection of image data by action recording module 601 and apparatus 110 using function button 430. In other embodiments, apparatus 110 may be configured to capture image data via action recording module 601. In one embodiment, processor 210 and image sensor 220 may be operatively connected via wires or other such mechanical couplings. In other embodiments, processor 210 and image sensor 220 may be operatively connected via wireless transceiver(s) 530.

Trigger information module 602 may provide functionality for apparatus 110 to analyze real-time image data captured by image sensor 220 and action recording module 601, and more specifically, to identify and analyze one or more triggers in image data captured by image sensor 220 of apparatus 110. The term "trigger" includes any information in the image data that may cause apparatus 110 to execute an action. For example, apparatus 110 may detect as a trigger a finger or hand of user 100 holding an object. In some embodiments, apparatus 110 may begin acquiring image data via image sensor 220 when a trigger is detected. In other embodiments, image sensor 220 may already be acquiring image data, and the detection of a trigger by trigger information module 602 may cause processor 210 or other modules stored in memory 550 to execute software instructions to perform various tasks. In these embodiments, processor 210 may be configured to transmit image data (either stored data or in real time) to a remote system such as server 250 for purposes of analyzing the image data to determine whether a trigger is present in the image data.

In alternative embodiments, action recording module 601 may not record any data; instead, trigger information module 602 may simply analyze images viewed through image sensor 220. In these embodiments, information relating to a trigger, to an associated object or objects, or to user 100 may be extracted by trigger information module 602, and the information may be transmitted to an external system, such as server 250.

Trigger information module 602 may also be configured to determine from the captured image data particular information about one or more of an object associated with the trigger, or about user 100. For example, in a particular circumstance, trigger information module may recognize the hand of user 100 in the image data, and may interpret the hand of user 100 as a trigger. Trigger information module 602 may analyze image data in which the hand trigger appears. In these embodiments, other information may be extracted from the image data, as will be discussed in detail below. For example, the hand of user 100 serving as the trigger may be holding an object, and after detecting the trigger and the object, trigger information module 602 may determine information about the object and transmit that information to an external server (such as server 250) or to a database (such as databases 607-609). Additionally or alternatively, trigger information module 602 may be configured to send a query to external servers or databases regarding a trigger or an associated object. In these embodiments, trigger information module 602 may be configured to receive additional information or instructions from the remote servers or databases, and may use that information or instructions to perform tasks. Trigger information module 602 may also be configured to determine information about the user 100 of apparatus 110, such as demographic information of the user, past behavior of the user, or past interactions between the user, the trigger, and the object, if any.

Position information module 603 may provide functionality for apparatus 110 and processor 210 to determine positional information for events and activities captured by image sensor 220 and action recording module 601. In some embodiments, position information module 603 may generate positional information associated with this image data, and may store it within memory 550 for later access and analysis. This positional information may take the form of metadata, labels on images indicating location, or any other such information. Position information module 603 may determine and/or generate positional information in various ways. For example, position information module 603 may comprise a global positioning system (GPS) receiver, and may determine positional information by receiving GPS coordinates from associated satellites. In other embodiments, position information module 603 may be programmed to include map data, and may be configured to detect the location of apparatus 110 and/or user 100 (or other associated objects) from the map data. Any other means of determining or deriving positional information may be used that are familiar to those of skill in the art.

Time information module 604 may provide functionality for apparatus 110 and processor 210 to determine the elapsed time between events and activities captured by image sensor 220 and action recording module 601. In some embodiments, time information module 604 may generate time information associated with this image data, and may store it within memory 550 for later access and analysis. This time information may take the form of a "timestamp," metadata, or any other such information. In alternative embodiments, time information module 604 may be configured to generate a visual display of the time on images from the captured image data.

Feedback generation module 605 may provide functionality for apparatus 110 to generate and transmit information to user 100, or to a third party or a remote computing system, such as server 250. Processor 210 may execute feedback generation module 605 to generate and process feedback in a given context, then transmit the generated feedback to feedback-outputting unit 320 for output. In one embodiment, processor 210 and feedback-outputting unit 320 may be operatively connected via a wire or other such direct connection. In other embodiments, processor 210 and feedback-outputting unit 320 may be operatively connected via wireless transceiver(s) 530. In some embodiments, feedback generation module 605 may generate audible feedback to user 100 or a third party. In other embodiments, feedback generation module 605 may generate textual or graphical feedback, such as statistics, data, or information.

As shown in FIG. 6, memory 550 is also configured to store a database access module 606. The processing device may execute instructions associated with database access module 606 to access user object database 607, advertising database 608, and object information database 609, for example, to retrieve previously stored image data, predefined actions, and/or rules for performing analysis of the image data. The processing device may also execute instructions associated with database access module 606 to store data and information in each of user object database 607, advertising database 608, and object information database 609.

In the embodiment shown in FIG. 6, memory 550 is configured to store a user object database 607. User database 607 may be configured to store information associated with various objects that user 100 has previously detected and described when those objects were associated in image data captured by image sensor 220 and associated with a trigger detected and analyzed by trigger information module 602. This process will be discussed in further detail below in association with FIG. 8 and process 800. In essence, user database 607 may serve as a "catalog" of objects that user 100 has previously held and perceived, and may serve as a reference to retrieve information about those objects in the future or to help locate a previously-held object.

In the example shown in FIG. 6, memory 550 is also configured to store an advertising database 608. Advertising database 608 may be configured to store information relating to objects that are products, such as branded products. In some embodiments, when user 100 perceives and holds an object, trigger information module 602 and/or position information module 603 may be executed to determine that the object is a product, and may determine that the product is associated with a particular brand or sponsor. In these embodiments, processor 210 may be configured to transmit information about the user (such as the demographic information described above, as well as additional information such as purchasing habits of user 100) and/or the perceived product to advertising database 608, or to an external server, such as server 250. As will be discussed in further detail below, advertising database 608 and/or server 250 may then be configured to return advertising information for presentation to user 100 based on the user information and product information.

Memory 550 may also be configured to store an object information database 609. Object information database 609 may contain general information about a vast number of objects that could potentially be encountered or analyzed by apparatus 110. As a non-limiting example, object information database 609 may contain information about products, food items, pharmaceutical drugs, plants, animals, humans, landmarks, etc. In these embodiments, object information database 609 may be akin to an encyclopedia, where information on a wide variety of topics may be stored. Information stored in object information database 609 may inform data entries for catalogued objects stored in user object database 607.

Action recording module 601, trigger information module 602, position information module 603, time information module 604, feedback generation module 605, database access module 606, user object database 607, advertising database 608, and object information database 609 may be implemented in software, hardware, firmware, a mix of any of those, or the like. For example, if the modules are implemented in software, they may be stored in memory 550, as shown in FIG. 6. The databases may be stored within memory 550 as well, or may be stored on a remote computer system (such as server 250) accessible by apparatus 110 through database access module 606. Other components of processor 210 may be configured to perform processes to implement and facilitate operations of the modules.

Thus, action recording module 601, trigger information module 602, position information module 603, time information module 604, feedback generation module 605, database access module 606, user object database 607, advertising database 608, and object information database 609 may include software, hardware, or firmware instructions (or a combination thereof) executable by one or more processors (e.g., processor 210), alone or in various combinations with each other. For example, the modules may be configured to interact with each other and/or other modules of apparatus 110 to perform functions consistent with disclosed embodiments. In some embodiments, any of the disclosed modules (e.g., action recording module 601, trigger information module 602, position information module 603, time information module 604, feedback generation module 605, and database access module 606) may each include dedicated sensors (e.g., image sensors, etc.) and/or dedicated application processing devices to perform the functionality associated with each module.

As used herein, real-time image data may refer to image data captured in real-time or near real-time. For example, action recording module 601 may monitor the field-of-view of apparatus 110 to detect inputs. Accordingly, action recording module 601 and any of the other disclosed modules may operate in parallel to process captured image data. That is, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

Figure 7B:
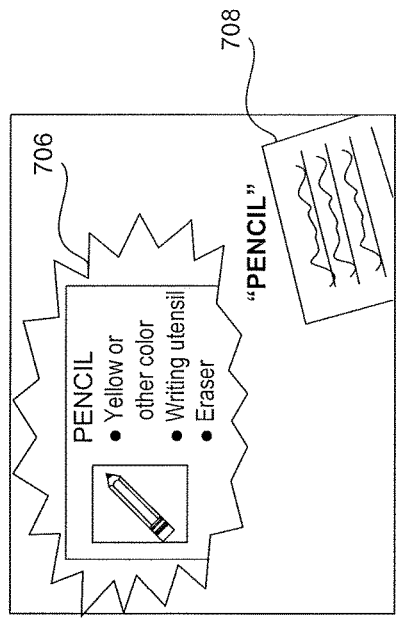
FIGS. 7A-7D are example illustrations of image data captured by a wearable camera system as part of an apparatus for deriving and storing information relating to objects held by a user in image data from a wearable camera system, consistent with disclosed embodiments.
Figure 7D:
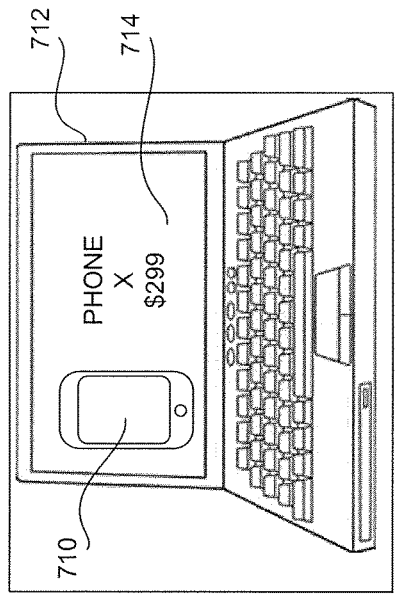
Figure 7A:
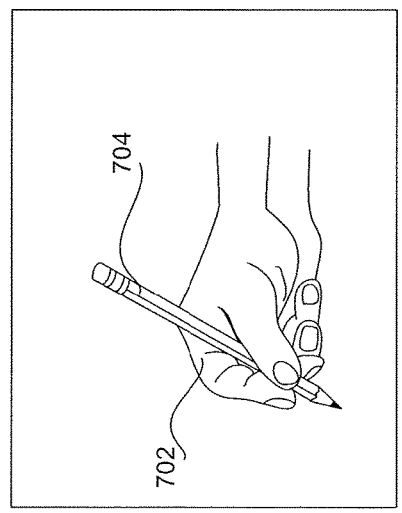

FIGS. 7A-7D illustrate examples of image data captured by apparatus 110 representing fields of view of image sensor 220, consistent with certain disclosed embodiments. In some embodiments, the field of view of image sensor 220 may correspond to or be similar to the field of view of user 100. In the example of FIG. 7A, image data captured by image sensor 220 indicates that hand 702 of user 100 is holding an object, here, pencil 704. Processor 210 may be configured to execute action recording module 601 to record the image data, or may be configured to automatically be recording the image data in real time. In some embodiments, such as the example illustrated in FIG. 7A, processor 210 (via trigger information module 602) may be configured to recognize hand 702 as a trigger. This process will be described in further detail below in association with FIG. 8 and process 800. In brief, after detecting the presence of hand-related trigger 702, processor 210 may be configured to take one or more of a number of alternative actions. In the illustrated embodiment of FIG. 7A, processor 210 may be configured to store information related to an object that user 100 is holding that is associated with hand-related trigger 702. Alternatively, user 100 may affirmatively indicate in some manner that he/she wishes to store information about a trigger-associated object, such as a verbal command transmitted through a microphone associated with apparatus 110.

Consistent with disclosed embodiments, apparatus 110, via action recording module 601, may record the presence of trigger-associated object 704, which in FIG. 7A is a pencil. Via trigger information module 602, apparatus 110 may execute software instructions to derive information about one or more of user 100, trigger 702, or object 704. In some embodiments, trigger information module 602 may derive information from the captured image data related to object 704. In these embodiments, the derived information may include a position of user 100 and/or apparatus 110 when the object 704 was encountered. Processor 210 may execute position information module 603 to determine this information. The derived information may further include a date and time when the object 704 was encountered. Processor 210 may execute time information module 604 to determine this information. Trigger information module 602 may also derive, receive, or otherwise determine information about the object 704. This may include a name of the object, a category that the object belongs to, and/or previous interactions with the object by the user, etc. In some embodiments, processor 210 may execute database access module 606 to access information about object 704 from object information database 609. In other embodiments, apparatus 110 may be configured to receive information about object 704 from user 100. For example, apparatus 110 may be equipped with a microphone, and may be configured to receive verbal information from user 100 about object 704. In other embodiments, user 100 may be able to submit information about object 704 in textual form, such as from an external computer system or a mobile device, such as computing device 120. Additionally or alternatively, trigger information module 602 may further determine or access information about user 100 before, during, or after information about object 704 is determined. In these embodiments, the user information may include demographic information such as age, income, marital status, gender, and/or geographic location, etc.

Processor 210 may be configured to store the user and/or object information derived from the image data, for example, in memory 550 or in user object database 607 via database access module 606. In these embodiments, the information may be stored in a profile or other file associated with user 100. The stored profile information may be used by one or more of action recording module 601 or trigger information module 602 to identify user 100 in the future within image data captured by image sensor 220. FIG. 7B illustrates an example of stored user object information, in the form of an entry that may be stored and accessed within user object database 607. After determining information about object 704 (here, a pencil) either from input from user 100 or from accessing data from the Internet or a remote database such as object information database 609, processor 210 may, via database access module 606, create an entry associated with the object that can be accessed in the future. An example database entry 706 for pencil 704 is illustrated in FIG. 7B. Database entry 706 may contain a variety of information about object 704, such as an image taken from image data recorded by action recording module 601, a list of physical characteristics or other details about the object, one or more locations where the object was encountered (as determined by position information module 603), and/or dates and times when the object was encountered (as determined by time information module 604), etc. In some embodiments, processor 210 may execute feedback generation module 605 to generate audio, visual, and/or other feedback about the object 704 that may be used in the future to identify the object when seen again or to help find the object if it is lost. In the example of FIG. 7B, feedback generation module 605 has generated the audible feedback 708 "PENCIL" to memorialize the name of object 704. In these embodiments, future interactions with either the same pencil 704 or another similar such item may result in one or more of action recording module 601, trigger information module 602, feedback generation module 605, or database access module 606 to be executed by processor 210. For example, user 100 may hold up pencil 704 in front of the field of view of image sensor 220 at a future time and date (as determined by time information module 604) and feedback generation module 605 may transmit audible feedback 708 to remind user 100 of the object and/or its prior history. Other such feedback may be provided to user 100, such as previous dates, times, and/or places where the object was encountered, etc.

In other embodiments, apparatus 110 may receive a query or other feedback from user 100 that processor 210 may use to bring up information about an object 704. This process will be discussed in further detail below. In brief, in an example embodiment user 100 may speak the word "PENCIL" into a microphone associated with apparatus 110. In response, processor 210 may execute one or more of feedback generation module 605 or database access module 606 to call up information 706 associated with pencil 704 in user object database 607. For example, a stored image of the pencil may be displayed in the field of view of user 100, if apparatus 110 is in the form of glasses. Feedback generation module 605 may also provide audible feedback to user 100 with information associated with object 704.

Figure 7C:
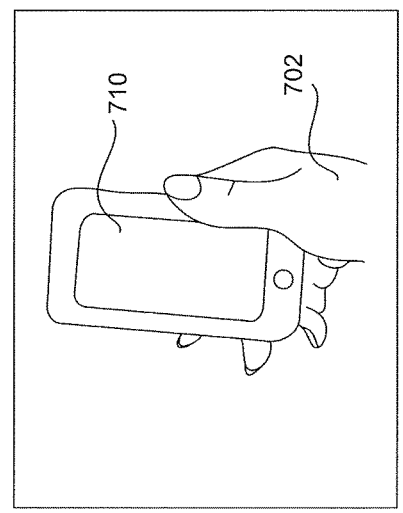

Variations on this basic process can be employed by user 100 or by third parties to perform various tasks. In one example, object information may be used to generate targeted advertising and marketing to user 100. In FIG. 7C, user 100 can be seen to be holding smartphone 710 in hand 702 in an example image from image data acquired by image sensor 220. As discussed above, action recording module 601 may record this image data, and trigger information module 602 may recognize hand 702 as a trigger that results in other actions taken by apparatus 110 and processor 210. In the example embodiment of FIGS. 7C-7D, trigger information module 602 (or other equipped modules) may be executed to determine information about the object that user 100 is holding. In FIG. 7C, for example, user 100 may be at a retail store and may be examining smartphone 710 while shopping. Trigger information module 602 may determine that user 100 is shopping and is looking at smartphone 710, and via database access module 606, may transmit this information to a remote computer system (such as server 250) or to a database dedicated to this purpose, such as advertising database 608. In these embodiments, trigger information module 602 may simultaneously transmit information about user 100, such as demographic information, information about past behavior of user 100, and/or information about past purchases made by user 100, etc.

Server 250 may receive, review, and analyze the received data to select an advertisement or a promotion from advertising database 608 to prepare for user 100. For example, in the example illustrated in FIG. 7D, user 100 can be seen at a later time interacting with laptop computer 712. For example, user 100 may be accessing the Internet via the World Wide Web, or may be checking electronic mail (email) messages. Via either of these methods (or another method), user 100 may be presented with an advertisement or promotion for object 710 (here, a smartphone) by server 250. Server 250 may be associated with one or more entities related to smartphone 710, including but not limited to the manufacturer of smartphone 710, a retailer selling smartphone 710, an outside advertising agency (who may have access to advertising database 608), or other such entities.

Figure 8:
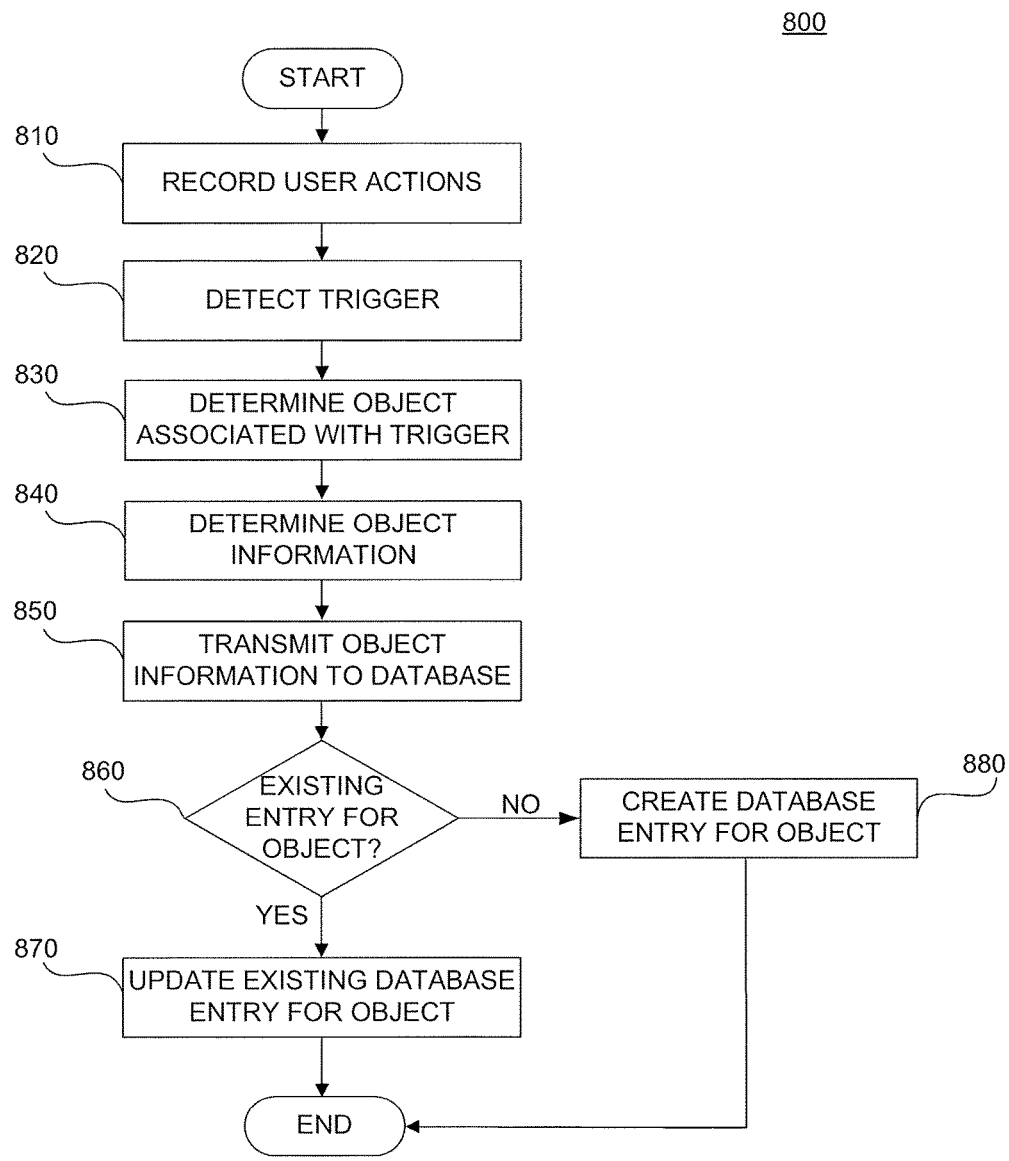
FIG. 8 is an example of a process for deriving and storing information relating to objects held by a user in image data from a wearable camera system, consistent with disclosed embodiments.

FIG. 8 illustrates an example of a process 800 for storing trigger-associated object information consistent with certain disclosed embodiments. Process 800, as well as any or all of the individual steps therein, may be performed by various aspects of apparatus 110, such as processor 210, image sensor 220, action recording module 601, trigger information module 602, position information module 603, time information module 604, feedback generation module 605, database access module 606, or any subcomponents therein. In some embodiments, one or more steps of process 800 may be performed by a remote computing system, such as computing device 120 or server 250. For exemplary purposes, FIG. 8 is described as being performed by processor 210, executing software instructions stored within memory 550.

Processor 210 may execute software instructions via action recording module 601 that enable apparatus 110 to record real-time image data representing actions of a user 100 using a camera associated with an image sensor, such as image sensor 220 (Step 810). In some embodiments, the captured first set of real-time image data may be received as a single streaming video file. In other embodiments, the real-time image data may be received as a series of still images. When the captured image data is received, processor 210 may store the data in memory 550.

According to some embodiments, trigger information module 602 may configure components of apparatus 110, such as image sensor 220 and/or other components, to operate in a "ready mode" for trigger detection. Trigger information module 602 may determine if a trigger, such as user 100's hand 702, is present in the real-time image data (Step 820). Trigger information module 602 may further determine information associated with the determined hand trigger. For example, in some embodiments, trigger information module 602 may be configured to detect and recognize different gestures made by hand 702 and may detect or derive different information based on the gestures. This process will be discussed in additional detail below in association with FIGS. 9-13.

In these embodiments, apparatus 110 may initially prompt user 100 to mime various hand triggers. Trigger information module 602 may capture images of the various hand triggers and store them in one or both of memory 550 or user object database 607 for ready recognition in the future. In alternative embodiments, trigger information module 602 may not be configured to recognize a particular hand, and may be pre-configured to recognize any hand, similar appendage, or equivalent substitute. In some embodiments, trigger information module 602 may be configured to recognize the hand of user 100 when it is covered in a glove, mitten, or other covering.

Processor 210 may be configured to begin recording image data via action recording module 601 after identifying one or more triggers in image data captured by image sensor 220 of apparatus 110. In these embodiments, processor 210 may be configured to transmit image data (either stored data or in real time) to a remote system such as server 250 for purposes of analyzing the image data to determine whether a trigger is present in the image data.

In alternative embodiments, action recording module 601 may not record any data; instead, various modules stored within memory 550 may simply analyze images viewed through image sensor 220. In these embodiments, information relating to user 100 or an object may be extracted by trigger information module 602, and the information may be transmitted to an external system, such as server 250.

Processor 210 may execute software instructions via one or more of action recording module 601 or trigger information module 602 that enable apparatus 110 to detect that an object is associated with the hand-related trigger detected in the image data (Step 830). In some embodiments, Step 830 may be performed by a remote computing system, such as server 250.

For example, in the illustration previously described in FIGS. 7A and 7C, hand 712 is holding an object (704/710). Trigger information module 602 may be configured to determine that hand 712 is performing some sort of action based on its proximity to the object. For example, hand 712 may be holding an object, pointing to an object, touching an object, grabbing an object, picking up an object, dropping an object, manipulating an object, operating an object, etc. Action recording module 601 and/or trigger information module 602 may be configured to perform analysis on the real-time image data in order to determine, i.e., by pixel proximity, gestures, etc., that an object is associated with the trigger.

Via one or more of action recording module 601, trigger information module 602, position information module 603, and time information module 604, processor 210 may proceed to determine information about the trigger-associated object (Step 840). In some embodiments, Step 840 may be performed by a remote computing system, such as server 250. As discussed above in association with FIGS. 7A-7D, the information related to the object that processor 210 may determine may include, but not be limited to, a time that the object was associated with the hand of the user. Time information module 604 may be configured to assist processor 210 in determining this time via image data captured by image sensor 220 over a pre-determined time period, such as hours, days, weeks, months, or years. In these embodiments, the data may be sent to a remote system, such as server 250 for further analysis. Time information module 604 may in some embodiments configure a time to be displayed on or with the real time image data, indicating, for example, that a particular object (such as pencil 704) was held by the user at a particular time on a particular day, i.e. 7:00 PM on January 5th. In some embodiments, time information module 604 may also be executed to determine a duration of time that the object was associated with the hand. Any time-related information pertaining to the object may be determined by time information module 604.

The information related to the object may be a location of the user when the object was associated with the hand of the user. Position information module 603 may be configured to assist processor 210 in determining this position information via image data captured by image sensor 220. In these embodiments, the data may be sent to a remote system, such as server 250 for further analysis. Position information module 603 may in some embodiments configure positional information to be displayed on or with the real time image data, indicating, for example, that a particular object (such as pencil 704) was held by the user at a given location such as 500 Main Street. The location may also be expressed in terms of GPS coordinates, latitude and longitude measurements, map data grid coordinates, etc. Any position-related information pertaining to the object may be determined by position information module 603.

The information related to the object may be an identifier of the object. Trigger information module 602 may be configured to assist processor 210 in determining an identifier for a trigger-associated object via image data captured by image sensor 220. In these embodiments, the data may be sent to a remote system, such as server 250 for further analysis. As discussed above in association with FIGS. 7A-7C, trigger information module 602 may determine information about a trigger-associated object in a variety of ways. In some embodiments, apparatus 110 may solicit information from user 100 about the object via an associated microphone. In other embodiments, processor 210 may execute one or more of trigger information module 602, position information module 603, or time information module 604 to determine context relating to the object and/or the trigger to determine information. For example, in the illustration of FIGS. 7C-7D, processor 210 may determine that user 100 is holding a smartphone 710 in a retail establishment selling electronics. In still other embodiments, processor 210 may execute one or more of action recording module 601, trigger information module 602, or database access module 606 to compare the image of the trigger-associated object from the image data to known objects. For instance, in the example of FIG. 7C, processor 210 may execute database access module 606 to compare the image of smartphone 710 to a variety of smartphones stored in object information database 609. Processor 210 may determine via this analysis that smartphone 710 is in fact "PHONE X" as shown in FIG. 7D.

In some embodiments, apparatus 100 may further comprise a communications interface, such as one or more of wireless transceiver(s) 530 or data port 570. In these embodiments, processor 210 may be programmed to cause transmission of the determined information related to the trigger-associated object via this communications interface to a remotely located computing device for inclusion in a catalog of objects associated with the user. (Step 850). For example, processor 210 may execute database access module 606 to transmit the object information for storage in user object database 607. In some embodiments, Step 850 may be performed by a remote computing system, such as server 250. In some embodiments, user object database 607 may be located within memory 550. In other embodiments, user object database 607 may be located on a remote computer system, such as server 250.

Processor 210 (via database access module 606) may determine whether or not a database entry exists for the trigger-associated object within user object database 607 (Step 860). In some embodiments, Step 860 may be performed by or in conjunction with a remote computing system, such as server 250. In some embodiments, user object database 607 may be organized in various ways that may facilitate searching the database for entries relating to a trigger-associated object. For example, user object database 607 may be organized into categories or types of objects, and subcategories/subtypes thereof. Part of the object information determined and identified for the trigger-associated object in Step 840 by processor 210 and modules stored in memory 550 may include a type and subtype of object that the object fits into.

Based on these parameters, processor 210 and/or server 250 may determine that there is an existing entry for the trigger-associated object (Step 860:YES; Step 870), and may determine whether or not to add to or update the stored object information within user object database 607. For example, an image of the trigger-associated object may have been acquired by image sensor 220 via action recording module 601. Processor 210 may update the database entry (such as entry 706) by initiating storage of the newly-acquired image(s), and deleting one or more older images associated with the trigger-associated object within the database entry. Processor 210 and/or server 250 may update an existing database entry for the object by adding, deleting, or revising any object information associated with the entry. The updated information may be graphical or textual.

Processor 210 and/or server 250 may determine that there is not an existing entry for the trigger-associated object within user object database 607 (Step 860:NO; Step 880). In these embodiments, processor 210, via one or more of trigger information module 602, position information module 603, time information module 604, feedback generation module 605, and database access module 606, may create a new database entry (such as entry 706) for the trigger-associated object within user object database 607. Via database access module 606, processor 210 may add all or any portion of the determined object information to the new database entry, and may determine which type or subtype the object belongs to within user object database 607. In some embodiments, processor 210 and/or server 250 may cause transmission of the information related to the object to computing device 120 for inclusion in a catalog of objects associated with the user. For example, processor 210 of apparatus 110 may cause such transmission to occur using wireless transceiver 530.

FIGS. 9A-9D illustrate examples of image data captured by apparatus 110 representing fields of view of image sensor 220, consistent with certain disclosed embodiments. In some embodiments, the field of view of image sensor 220 may correspond to or be similar to the field of view of user 100. The examples of FIGS. 9A-9D are similar to those of FIGS. 7A-7D, but illustrate the application of process 800 and related processes to the selection of one or more warnings for user 100 based on the trigger-associated object.

Figure 9A:
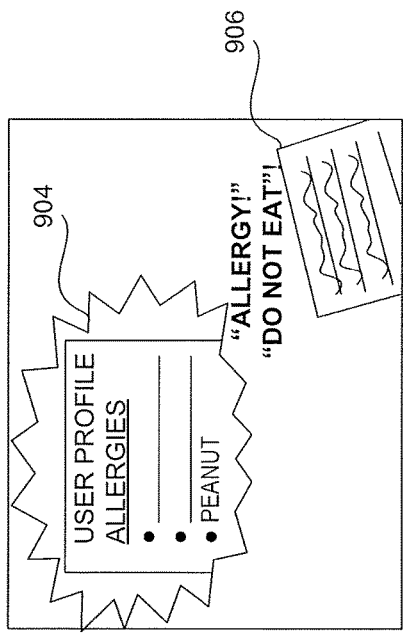
FIGS. 9A-9D are example illustrations of image data captured by a wearable camera system as part of an apparatus for deriving and storing information relating to objects held by a user in image data from a wearable camera system, consistent with disclosed embodiments.

In the example of FIG. 9A, image data captured by image sensor 220 indicates that hand 702 of user 100 is holding an object, here, peanut 902. Processor 210 may be configured to execute action recording module 601 to record the image data, or may be configured to automatically be recording the image data in real time. In some embodiments, such as the example illustrated in FIG. 9A, processor 210 (via trigger information module 602) may be configured to recognize hand 702 as a trigger, as discussed above in association with process 800. As before, processor 210 may be configured to store information related to an object that user 100 is holding that is associated with hand-related trigger 702. Alternatively, user 100 may affirmatively indicate in some manner that he/she wishes to store information about a trigger-associated object, such as a verbal command transmitted through a microphone associated with apparatus 110.

Consistent with disclosed embodiments, apparatus 110, via action recording module 601, may record the presence of peanut 902. Via trigger information module 602, apparatus 110 may execute software instructions to derive information about trigger 702 and peanut 902. As will be discussed in further detail below in association with FIGS. 10-11 and processes 1000 and 1100, in some embodiments, trigger information module 602 may derive information from the captured image data related to peanut 902. In these embodiments, the derived information may include a position of user 100 and/or apparatus 110 when the object 704 was encountered. Processor 210 may execute position information module 603 to determine this information. The derived information may further include a date and time when the object 704 was encountered. Processor 210 may execute time information module 604 to determine this information. Trigger information module 602 may also derive, receive, or otherwise determine information about the object, such as peanut 902. This may include a name of the object, a category that the object belongs to, and/or previous interactions with the object by the user, etc.

In these embodiments, processor 210 may execute database access module 606 to access information about peanut 902 from one or more of user object database 607 or object information database 609. In other embodiments, apparatus 110 may be configured to receive information about peanut 902 from user 100. For example, apparatus 110 may be equipped with a microphone, and may be configured to receive verbal information from user 100 about peanut 902. In other embodiments, user 100 (or a third party, such as a physician or other medical professional) may be able to submit information about peanut 902 as it relates to user 100 in textual form, such as from an external computer system or a mobile device, such as computing device 120. Additionally or alternatively, trigger information module 602 may further determine or access information about user 100 before, during, or after information about peanut 902 is determined. In these embodiments, the user information may include demographic information such as age, income, marital status, gender, and/or geographic location, etc.

Figure 9B:
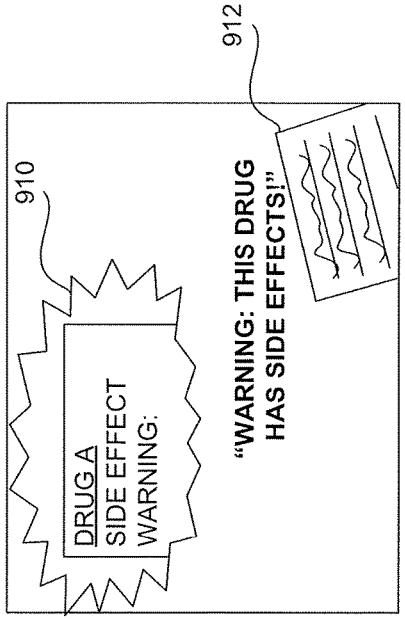

In the example of FIG. 9B, processor 210 via database access module 606 has accessed an existing database entry 904 for peanut 902 within a user object database 607 associated with user 100. In this illustration, a sub-type of objects within user object database 607 are objects that require the generation of warnings to user 100 due to safety risks or other hazards. Here, user 100 has a peanut allergy, and so database entry 904 is contained within this sub-type.

Processor 210 may analyze this information and determine that a warning is necessary. In these embodiments, feedback generation module 605 may be executed to generate audible, visible, or tactile feedback to user 100, such as feedback 906. Feedback 906 is an audible warning to user 100 that peanut 902 is associated with an "ALLERGY!" and that user 100 is warned "DO NOT EAT!" In alternative embodiments, processor 210 may transmit the object information associated with peanut 902 as well as user information (such as demographics or medical history) associated with user 100 to a remotely located computing device (such as server 250) in order to determine the selection of one or more warnings to user 100.

Figure 9C:
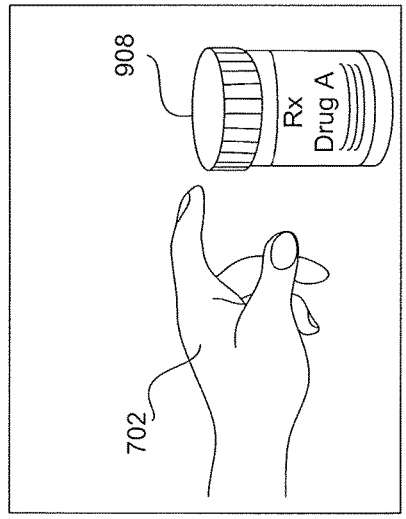
Figure 9D:

Variations on this basic process can be employed by user 100 or by third parties to perform various tasks. In the examples of FIGS. 9C-9D, the object is now pill bottle 908, which can be seen to be held by hand 702 in FIG. 9C. As discussed above for peanut 902, processor 210 may determine information about the pills within bottle 908 to determine if they are safe for user 100. For example, processor 210 via action recording module 601 may perform optical character recognition (OCR) on the label of bottle 908 to read the text located on the label. The label on bottle 908 in FIG. 9C indicates that the pills are "DRUG A."

As discussed above, processor 210 or an external system may execute database access module 606 to compare the derived object information for pill bottle 908 with one or more of user object database 607 or object information database 609. In the illustration of FIG. 9D, a database entry 910 exists for DRUG A within user object database 607, and that entry 910 contains information regarding side effects of DRUG A that may be harmful to user 100.

Processor 210 may analyze this information and determine that a warning is necessary. In these embodiments, feedback generation module 605 may be executed to generate audible, visible, or tactile feedback to user 100, such as feedback 912. Feedback 912 is an audible warning to user 100 that DRUG A of pill bottle 908 is associated with side effects. In alternative embodiments, processor 210 may transmit the object information associated with pill bottle 908 as well as user information (such as demographics or medical history) associated with user 100 to a remotely located computing device (such as server 250) in order to determine the selection of one or more warnings to user 100.

Figure 10:
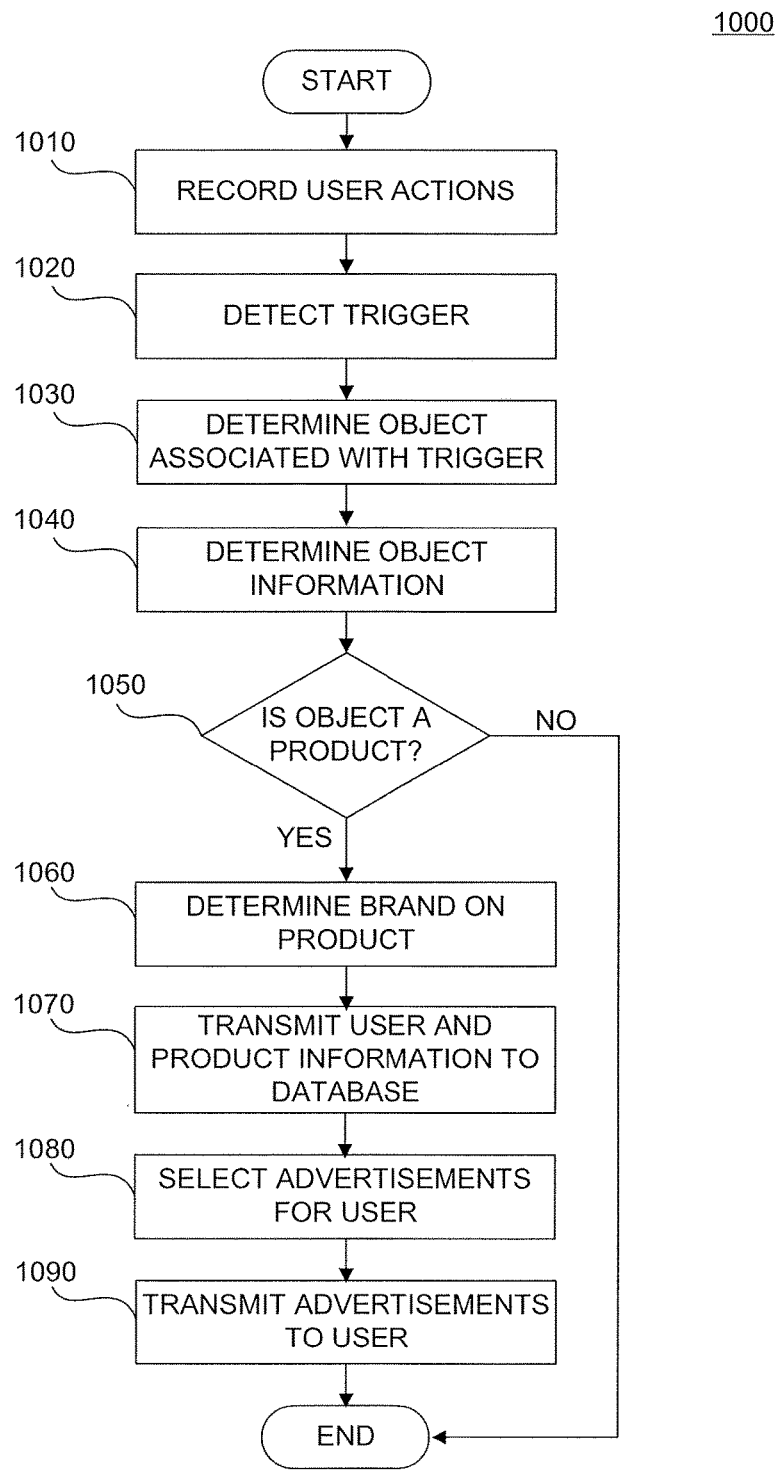
FIG. 10 is an example of a process for using stored object information to select advertisements for a user of a wearable camera system, consistent with disclosed embodiments.

FIG. 10 illustrates an example of a process 1000 for selecting advertisements for a user based on trigger-associated object information consistent with certain disclosed embodiments. Process 1000, as well as any or all of the individual steps therein, may be performed by various aspects of apparatus 110, such as processor 210, image sensor 220, action recording module 601, trigger information module 602, position information module 603, time information module 604, feedback generation module 605, database access module 606, or any subcomponents therein. In some embodiments, one or more steps of process 1000 may be performed by a remote computing system, such as computing device 120 or server 250. For exemplary purposes, FIG. 10 is described as being performed by processor 210, executing software instructions stored within memory 550.

Process 1000 is related to and further describes the illustrated examples shown above in FIGS. 7C-7D, relating to targeting advertising to user 100 based on recognized objects associated with triggers (such as hand-related trigger 702). Steps 1010-1040 are substantially identical to Steps 810-840 of process 800, and will not be repeated here.

Via one or more of action recording module 601, trigger information module 602, or position information module 603, processor 210 may determine whether or not a trigger-associated object is a "product" (Step 1050). For purposes of this disclosure, a "product" may be defined as an object for sale in a retail store or similar merchant setting. For purposes of the description of process 1000, if processor 210 determines that a trigger-related object is not a product (Step 1050:NO), then process 1000 ends.

If processor 210 determines that the object is a product (Step 1050:YES), via analysis of the determined object information, processor 210 may be further programmed to identify a brand associated with the product (Step 1060). Processor 210 may make the determination in various ways. For example, via action recording module 601, processor 210 may capture image data from image sensor 220 showing a detailed view of the product sufficient to resolve any logo or other such branding information. In these embodiments, trigger information module 602 may also be used to derive information. Processor 210 may then execute database access module 606 to compare the derived branding information with information stored in object information database 609. Processor 210 may then determine if there is a match with an entry within database 609, and if there is, may identify the brand in that manner. In some embodiments, there may be no match with any entry in database 609, and in those embodiments the brand of the product may not be recognizable. In these embodiments, process 1000 may end and feedback generation module 605 may be optionally executed to inform the user that information about the product was not found.

Via associated communications interfaces such as data port 570 or wireless transceivers 530, processor 210 may transmit the derived product information as well as user information to a remotely located computing device (such as server 250) for use in the selection of one or more advertisements targeted to user 100. As described above in association with FIGS. 7C-7D, the user information may include demographic information, past behavior of the user, and/or past purchases.

Process 1000 may include transmitting user and product information to a database (Step 1070). For example, server 250 may transmit user and product information to object information database 609.

Server 250 (or alternatively, processor 210 via database access module 606) may select one or more advertisements or promotions for user 100 based on the received information (Step 1080). In these embodiments, server 250 may access advertising database 608, and based on the transmitted product and user information, may select advertisements catered specifically to that information. For example, as illustrated in FIG. 7C, the image data indicated that user 100 was holding smartphone 710, and server 250 may determine that user 100 should be shown an advertisement or provided a promotion (such as a discount or a coupon) relating to smartphone 710. In other embodiments, advertisements may be selected for user 100 that pertain to related products in the same industry or technology. In still other embodiments, advertisements may be selected for user 100 in a completely different field, based for instance on user 100's demographics. For example, if user 100 has a certain income, they might be shown advertisements listed in advertising database 608 as being catered to or attractive to people having that income.

Server 250 may transmit the selected advertisement to user 100 (Step 1090). The advertisement or promotion may be transmitted by various means, such as electronically via network 240, by text message, by print, by postal mail, etc. For example, in the illustration of FIG. 7D, advertisement 714 for smartphone 710 was viewed by user 100 on laptop 712, as a pop-up ad or in an email message. Any means familiar to those of skill in the art may be used to transmit the ad to user 100, such as providing the ad within an application executing on smartphone 710 (e.g., a shopping application, a banking application, social networking application, etc.).

Figure 11:
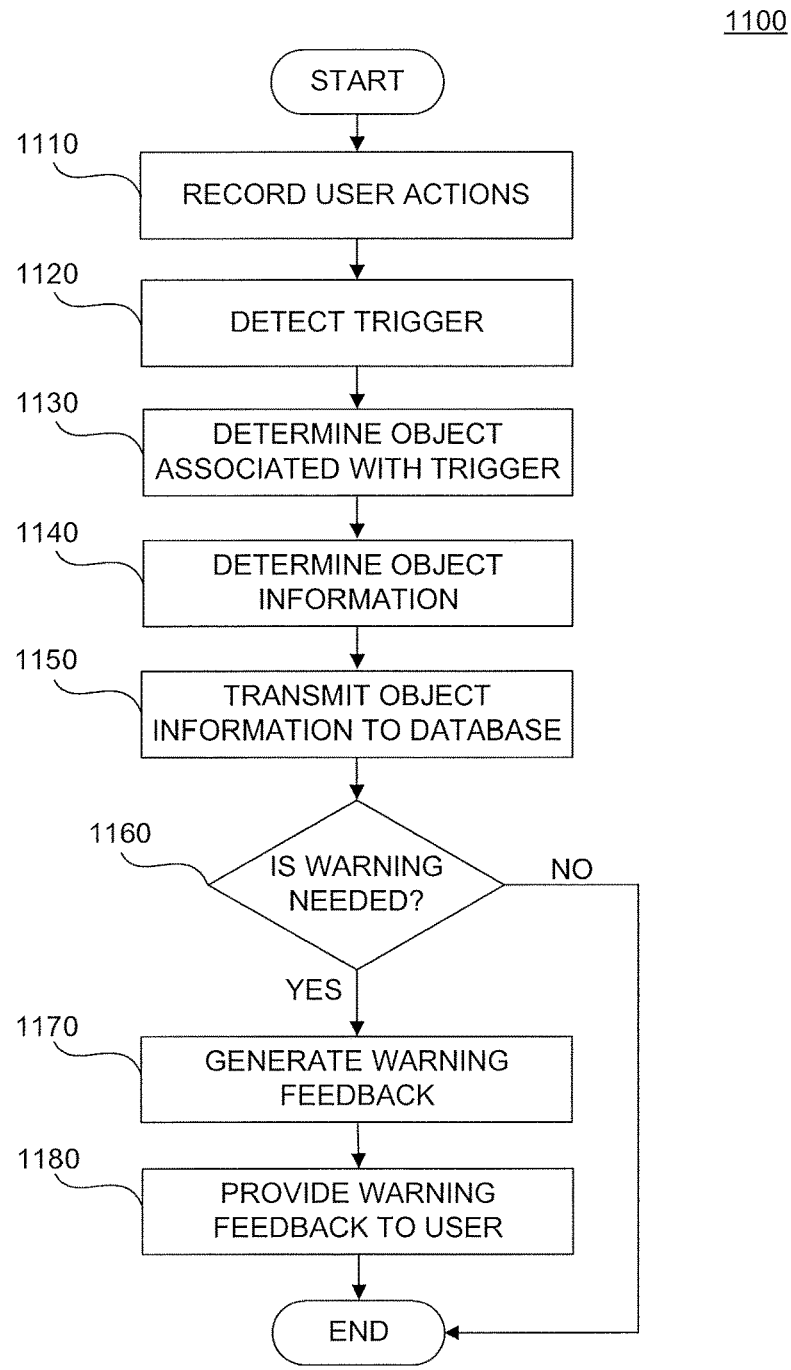
FIG. 11 is an example of a process for deriving and storing information relating to objects held by a user in image data from a wearable camera system, consistent with disclosed embodiments.

FIG. 11 illustrates an example of a process 1100 for deriving and storing information relating to objects held by a user in image data consistent with certain disclosed embodiments. Process 1100, as well as any or all of the individual steps therein, may be performed by various aspects of apparatus 110, such as processor 210, image sensor 220, action recording module 601, trigger information module 602, position information module 603, time information module 604, feedback generation module 605, database access module 606, or any subcomponents therein. In some embodiments, one or more steps of process 1000 may be performed by a remote computing system, such as computing device 120 or server 250. For exemplary purposes, FIG. 10 is described as being performed by processor 210, executing software instructions stored within memory 550.

Process 1100 is related to and further describes the illustrated examples shown above in FIGS. 9A-9D, relating to providing warnings to user 100 based on recognized objects associated with triggers (such as hand-related trigger 702). Steps 1110-1140 are substantially identical to Steps 810-840 of process 800, and will not be repeated here.

In Step 1150, processor 210 may transmit the derived user and object information to an external computer system or database, such as computing device 120 or server 250 and/or user object database 607 or object information database 609. The transmission may be achieved via the communications devices of apparatus 110 described above (i.e., data port 570 or wireless transceivers 530). Server 250 may be operably connected to apparatus 110 and may have the capability to execute one or more of the modules stored in memory 550.

Via one or more of action recording module 601, trigger information module 602, position information module 603, or time information module 604, processor 210 may determine whether or not a warning is needed for user 100 based on the derived and transmitted user information and object information as discussed above in association with FIGS. 7A-7D. For purposes of the description of process 1100, if processor 210 determines that no warning is needed (Step 1160:NO), then process 1100 ends.

Alternatively, server 250 and/or processor 210 may determine that a warning is needed (Step 1160). Server 250 may make the determination in various ways. For example, via action recording module 601, server 250 may analyze image data from image sensor 220 showing a detailed view of the object sufficient to resolve any label, logo or other such branding information. In these embodiments, trigger information module 602 may also be used to derive information. As discussed above in association with FIGS. 9B and 9D, server 250 and/or processor 210 may then execute database access module 606 to compare the derived user and object information with information stored in user object database 607 or object information database 609. As described, it may be determined that the database entries associated with the detected trigger-associated object (such as peanut 902 or pill bottle 908) may reside within a sub-type of database entries within databases 607/609 associated with warnings.

Via feedback generation module 605, server 250/processor 210 may generate warning feedback to the user (Step 1170). As shown above in FIG. 9B as feedback 906 and in FIG. 9D as feedback 912, a warning dialog may be generated to provide immediate, pertinent information to the user. In FIG. 9B, the user 100 was allergic to peanut 902, and so the user was warned not to eat the peanut. In FIG. 9D, DRUG A had significant side effects, and so the user was warned about those effects. One of skill in the art may envision any relevant warning that may need to be given to a user based on a particular user, a particular object, and a particular context. Server 250 may provide the feedback to user 100 (Step 1180). The warning feedback may be transmitted by various means, such as electronically via network 240, by text message, by email, by an application executing on a user device (e.g., computing device 120), by print, by postal mail, etc., as described previously.

Another application of wearable technology and "life logging" is the ability to locate lost items that the user has encountered and interacted with previously. Since the user may "log" certain interactions, a detected object associated with a trigger, such as the user's hand, may have its time and/or position logged for later use, and when the user indicates that the item is misplaced, apparatus 110 may call up the stored information to assist the user in re-locating the object.

For this embodiment, apparatus 110 may contain the same processor 210, memory 550, and other components as described above and as illustrated in FIGS. 5A-5C and 6. Thus, the descriptions of these same (or similar) modules and database are not repeated. Modules and databases associated with this embodiment may be identical to those of memory 550, or may be combined with them or used as alternatives.

Figure 12:
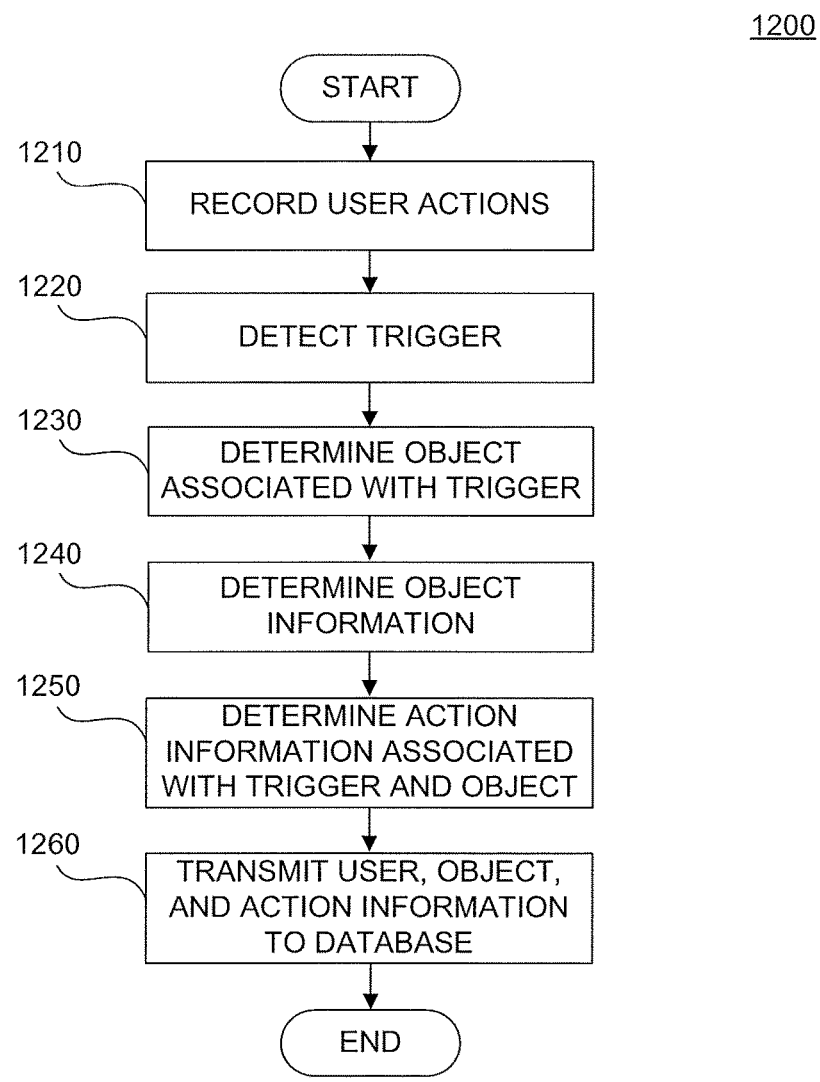
FIG. 12 is an example of a process for deriving and storing information relating to objects held by a user in image data from a wearable camera system, consistent with disclosed embodiments.

FIG. 12 illustrates a process 1200 for storing information relating to objects for later use when those objects are lost. Process 1200, as well as any or all of the individual steps therein, may be performed by various aspects of apparatus 110, such as processor 210, image sensor 220, action recording module 601, trigger information module 602, position information module 603, time information module 604, feedback generation module 605, database access module 606, or any subcomponents therein. In some embodiments, one or more steps of process 1300 may be performed by a remote computing system, such as computing device 120 or server 250. For exemplary purposes, FIG. 12 is described as being performed by processor 210, executing software instructions stored within memory 550.

Steps 1210-1240, relating to recording actions of the user, detecting a hand-related trigger, detecting an object of interest associated with the trigger, and determining information associated with that object, are all substantially identical to Steps 810-840 of process 800 described above, and will not be repeated here.

In Step 1250, processor 210 may be programmed to process image data received from image sensor 220 and captured using action recording module 601 to identify at least one action associated with the object. This identification may be performed with the assistance of trigger information module 602. For purposes of this disclosure, an associated "action" refers to the action that user 100 was performing with their hand (the trigger) relative to the object when the images were recorded. Examples of actions that may be determined by trigger information module 602 include holding, pointing to, touching, dropping, operating, manipulating, or grabbing, as discussed above. Of particular interest for later retrieval of lost items are the grabbing and dropping motions. Action recording module 601 may record the user 100 either dropping or grabbing a trigger-associated object from user 100's hand, and trigger information module 602 may extract and identify this action.

Along with the associated action, processor 210 may derive and store other information relating to the trigger-associated object of interest. For example, in these embodiments, the derived information may include a position of user 100 and/or apparatus 110 when the object was encountered. Processor 210 may execute position information module 603 to determine this information. The derived information may further include a date and time when the object 704 was encountered. Processor 210 may execute time information module 604 to determine this information. Trigger information module 602 may also derive, receive, or otherwise determine information about the object. This may include a name of the object, a category that the object belongs to, previous interactions with the object by the user, etc.

Processor 210, via associated communications interfaces, may transmit the derived user, object, and action information to an external computer system or database, such as server 250 and/or user object database 607 (Step 1260). The transmission may be achieved via the communications interfaces of apparatus 110 described above (i.e. data port 570 or wireless transceivers 530). Server 250 may be operably connected to apparatus 110 and may have the capability to execute one or more of the modules stored on memory 550.

If the trigger-associated object should later become lost or misplaced, it would be helpful to user 100 to know the last place that the object was seen and the time when it was last seen. The described apparatuses and systems permit this information to be stored in the process described above. For example, the position of the object as determined by position information module 603 in the image data when the object was grabbed or dropped by user 100 may be annotated in a database entry within user object database 607 as the "last known location" of that object. Images of where the object was last grabbed or dropped may also be included in the database entry within user object database 607, as captured by image sensor 220. Similarly, the time when the object was grabbed or dropped by user 100 as determined by time information module 604 in the image data may be annotated in the database entry as the "last time seen" of that object. This information may be transmitted to database 607 and/or to an external computing system such as computing device 120 or server 250 in order to provide a safeguard should the object later be lost.

Figure 13:
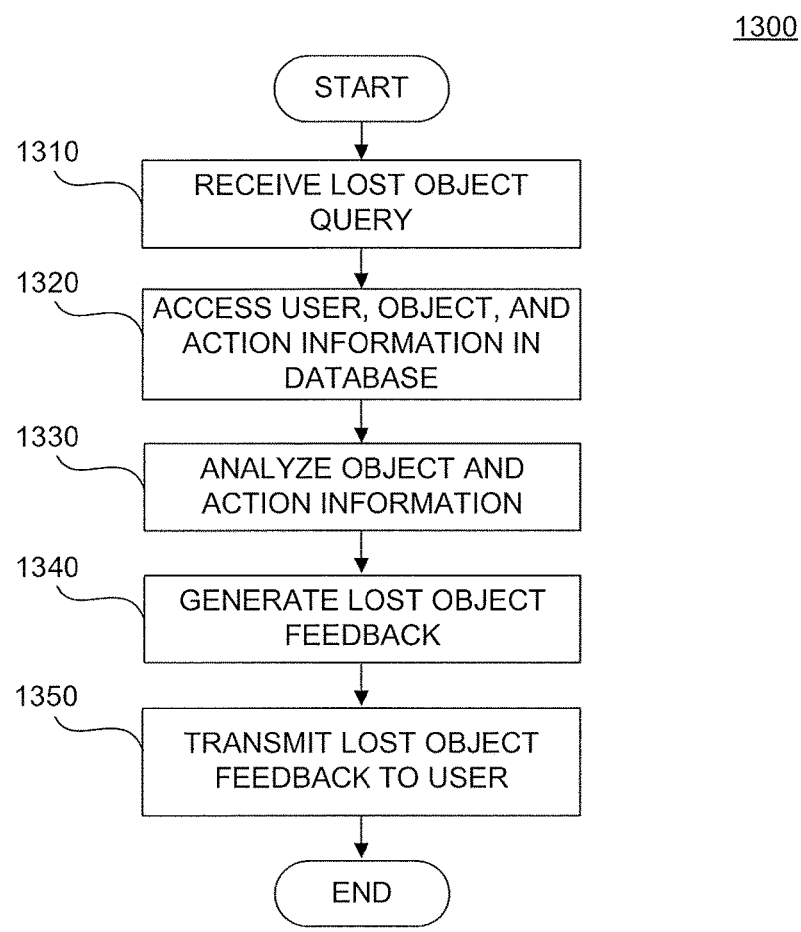
FIG. 13 is an example of a process for using stored object information to find lost objects, consistent with disclosed embodiments.

FIG. 13 illustrates a process 1300 for retrieving information previously stored for an object when that object is later lost. Process 1300, as well as any or all of the individual steps therein, may be performed by various aspects of apparatus 110, such as processor 210, image sensor 220, action recording module 601, trigger information module 602, position information module 603, time information module 604, feedback generation module 605, database access module 606, or any subcomponents therein. In some embodiments, one or more steps of process 1300 may be performed by a remote computing system, such as computing device 120 or server 250. For exemplary purposes, FIG. 13 is described as being performed by processor 210, executing software instructions stored within memory 550.

Processor 210 may receive a query from user 100 or from another computing system (such as device 120 or server 250) that an item has been lost (Step 1310). The query may be received by processor 210 by various means. For example, apparatus 110 may be equipped with a microphone, and user 100 may say into the microphone a command such as "FIND [OBJECT]." As described above, when processor 210 derives object information, it may include an audible name of the object, which may then be used as a search query for database access module 606 to use for querying user object database 607. The query may be received by other means; for example, user 100 may send a text message to an external system such as server 250 via computing device 120. Computing device 120 may also be configured to display a graphical user interface (GUI) that may be capable of displaying an inventory of objects that have related information stored within user object database 607. In these embodiments, user 100 may simply be able to select the object that he/she wishes to find.

Via database access module 606, processor 210 may access a previously-stored database entry containing user, object, and action information within user object database 607 (Step 1320). Processor 210, via one or more of trigger information module 602, position information module 603, and time information module 604, may analyze the accessed object and action information (Step 1330). The analyzed information may include, as non-limiting examples, the action that the user 100 was performing when the object was last seen. Processor 210 may determine, for example, that user 100 was either grabbing or dropping an object, such as a set of car keys, at a certain time and place as determined by position information module 603 and time information module 604. Any other information relevant to the last time and place that the missing object was last visualized by apparatus 110 and image sensor 220 may be analyzed by processor 210 and the modules stored within memory 550.

Via feedback generation module 605, server 250/processor 210 may generate lost object feedback to the user (Step 1350). The lost object feedback may comprise, as non-limiting examples, the derived information described above relating to the last time and place that the missing trigger-associated object was seen, as well as what the user 100 was doing at that time and place. For example, if the user 100 is looking for a set of missing car keys, and processor 210 has determined that user 100 1) dropped the keys 2) in a dresser drawer, 3) last Thursday at 4:00 PM, feedback generation module 605 may be executed to compile that information into an easy to digest form for user 100. For example, feedback generation module 605 may generate a combination audio and visual presentation to user 100, presenting the captured image data of the last time and place the missing object was seen, along with an audible summary such as "YOUR KEYS WERE LAST SEEN IN THE DRESSER DRAWER LAST THURSDAY AT 4 PM." One of skill in the art may envision any relevant warning that may need to be given to a user based on a particular user, a particular object, and a particular context. Processor 210/server 250 may provide the feedback to user 100 (Step 1350). The lost item feedback may be transmitted by various means, such as electronically via network 240, by text message, by email, by an application executing on a user device (e.g., computing device 120), by print, by postal mail, etc. as described previously. In some embodiments, the feedback is generated and transmitted as quickly as possible after the lost object query is received, such as within seconds or minutes.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for providing information related to objects associated with a hand of a user, the wearable apparatus comprising:
    a wearable image sensor configured to capture a plurality of images from an environment of the user; and
    at least one processing device programmed to:
        process at least one image in the plurality of images to detect the hand of the user in at least one of the plurality of images;
        process the at least one image to detect an object that is associated with the hand of the user;
        process the at least one image to identify at least one action of the hand associated with the object;
        in response to identification of the at least one action of the hand associated with the object:
            identify a last known location of the object; and
            store information related to the object, the information including the last known location;
        subsequently, in response to a query from the user indicating that the object is lost, retrieve the stored information including the last known location related to the object; and
        transmit the retrieved information for display.

2. The wearable apparatus of claim 1, wherein the information related to the object includes one or more of: a time that the object was associated with the hand of the user, a location of the user when the object was associated with the hand of the user, a duration in which the object was associated with the hand of the user, and an identifier of the object.

3. The wearable apparatus of claim 1, wherein the object associated with the hand of the user includes one or more of: an object that the user holds, an object that the user points to, an object that the user touches, an object that the user drops, an object that the user operates, an object that the user manipulates, and an object that the user grabs.

4. The wearable apparatus of claim 1, further comprising a communications interface, and wherein the at least one processing device is further programmed to cause transmission of the information related to the object, via the communications interface, to a remotely located computing device for inclusion in a catalog of objects associated with the user.

5. The wearable apparatus of claim 4, wherein the at least one processing device is further programmed to identify a type of the object, and the catalog of objects is organized according to types of detected objects.

6. The wearable apparatus of claim 4, wherein the at least one processing device is further programmed to identify the object by comparing an image of the object with stored images.

7. The wearable apparatus of claim 1, wherein the at least one processing device is further programmed to identify that the object is a product.

8. The wearable apparatus of claim 7, wherein the at least one processing device is further programmed to identify a brand associated with the product.

9. The wearable apparatus of claim 1, further comprising a communications interface, and wherein the at least one processing device is further programmed to cause transmission of the information related to the object, via the communications interface, to a remotely located computing device for use in the selection of one or more advertisements.

10. The wearable apparatus of claim 9, wherein the one or more advertisements is for a product related to the at least one object.

11. The wearable apparatus of claim 1, further comprising a communications interface, and wherein the at least one processing device is further programmed to cause transmission of the information related to the object, via the communications interface, to a remotely located computing device for use in the selection of one or more warnings to the user.

12. The wearable apparatus of claim 11, wherein the object is food and the one or more warnings is associated with allergy risks or diet concerns.

13. The wearable apparatus of claim 11, wherein the object is a drug and the one or more warnings is associated with drug side effects.

14. The wearable apparatus of claim 1, wherein the at least one processing device is further programmed to cause storage of one or more recent images of the object and delete one or more older images of the object.

15. The wearable apparatus of claim 1, wherein the at least one action of the hand includes one or more of: a grabbing action associated with the object, and a dropping action associated with the object.

16. The wearable apparatus of claim 1, wherein the wearable apparatus includes a communications interface, and the at least one processing device is programmed to cause transmission of information related to the last known location of the object to a remotely located computing device.

17. The wearable apparatus of claim 15, wherein the information includes an image showing where the object was last grabbed by the user.

18. The wearable apparatus of claim 15, wherein the information includes an image showing where the object was last dropped by the user.

19. A wearable apparatus for determining a last known location of an object, the wearable apparatus comprising:
   a wearable image sensor configured to capture a plurality of images from an environment of the user; and
   at least one processing device programmed to:
      process at least one image in the plurality of images to detect the hand of the user in at least one of the plurality of images;
      process the plurality of images to identify at least one action of a hand associated with the object of interest;
      in response to identification of the at least one action of the hand associated with the object of interest;
         identify a location associated with the detected image and produce location information related to the location, wherein the location information includes an image showing the last known location of the object of interest; and
         store, in a memory, the location information with information associated with the object of interest;
      subsequently, in response to a query from the user indicating that the object is lost, retrieve the stored information including the last known location related to the object; and
      transmit the retrieved information for display.

20. The wearable apparatus of claim 19, wherein the at least one processing device is further programmed to store at least one recent image of the object of interest, and delete at least one older image of the object of interest.

21. A method for providing information related to objects associated with a hand of a user of a wearable device, the method comprising:
   processing a plurality of images captured by a wearable image sensor included in the wearable device to detect the hand of the user in at least one of the plurality of images;
   processing at least one of the plurality of images to detect an object associated with the hand of the user;
   processing at least one of the plurality of images to identify at least one action of the hand of the user;
   in response to identification of the at least one action of the hand of the user:
      identifying a last known location of the object associated with the hand of the user; and
      storing information related to the object, the information including the last known location;
   subsequently, in response to a query from the user indicating that the object is lost, retrieving the stored information including the last known location related to the object; and
   transmitting the retrieved information for display.

22. The method of claim 21, further comprising:
   transmitting the information related to the object to a remotely located computing device for inclusion in a catalog of objects associated with the user.

23. The method of claim 21, further comprising:
   transmitting the information related to the object to a remotely located computing device for use in selecting one or more advertisements for the user.

24. A software product stored on a non-transitory computer readable medium and comprising data and computer implementable instructions for carrying out a method, the method comprising:
   processing a plurality of images captured by a wearable image sensor included in the wearable device to detect the hand of the user in at least one of the plurality of images;
   processing at least one of the plurality of images to detect an object associated with the hand of the user;
   processing at least one of the plurality of images to identify at least one action of the hand of the user;
   in response to identification of the at least one action of the hand of the user:
      identifying a last known location of the object associated with the hand of the user; and
      storing information related to the object, the information including the last known location;
   subsequently, in response to a query from the user indicating that the object is lost, retrieving the stored information including the last known location related to the object; and
   transmitting the retrieved information for display.

* * * * *

UNITED STATES PATENT AND TRADEMARK OFFICE
CERTIFICATE OF CORRECTION

PATENT NO. : 10,298,825 B2
APPLICATION NO. : 14/807373
DATED : May 21, 2019
INVENTOR(S) : Yonatan Wexler et al.

Page 1 of 1

It is certified that error appears in the above-identified patent and that said Letters Patent is hereby corrected as shown below:

On the Title Page

Item (72), "Inventors: Yonaton Wexler, Jerusalem (IL); Amnon Shashua, Mevaseret Zion (IL)" should read —Inventors: Yonatan Wexler, Jerusalem (IL); Amnon Shashua, Mevaseret Zion (IL)—.

Signed and Sealed this
Third Day of March, 2020

Andrei Iancu
*Director of the United States Patent and Trademark Office*